(12) United States Patent
Freedman et al.

(10) Patent No.: US 10,257,253 B1
(45) Date of Patent: Apr. 9, 2019

(54) SYSTEMS, METHODS, AND MEDIA FOR CORRELATING INFORMATION CORRESPONDING TO MULTIPLE RELATED FRAMES ON A WEB PAGE

(71) Applicant: Integral Ad Science, Inc., New York, NY (US)

(72) Inventors: Micah Freedman, Fairfax, CA (US); David Joseph Marquard, III, New York, NY (US); Moshe Silberman, Brooklyn, NY (US); Neil Wiltshire, Brooklyn, NY (US); Xinbei Zhang, Elmhurst, NY (US)

(73) Assignee: Integral Ad Science, Inc., New York, NY (US)

( * ) Notice: Subject to any disclaimer, the term of this patent is extended or adjusted under 35 U.S.C. 154(b) by 146 days.

(21) Appl. No.: 15/190,927

(22) Filed: Jun. 23, 2016

(51) Int. Cl.
*H04L 29/08* (2006.01)
*G06F 17/22* (2006.01)

(52) U.S. Cl.
CPC .......... *H04L 67/02* (2013.01); *G06F 17/2247* (2013.01)

(58) Field of Classification Search
CPC ....................................................... H04L 67/02
See application file for complete search history.

(56) References Cited

U.S. PATENT DOCUMENTS

2015/0051968 A1\* 2/2015 Sotelo ................ G06Q 30/0277 705/14.45
2015/0248723 A1\* 9/2015 Chandi ................... G06F 21/00 705/27.1

\* cited by examiner

*Primary Examiner* — Adnan M Mirza
(74) *Attorney, Agent, or Firm* — Byrne Poh LLP

(57) ABSTRACT

Systems, methods, and media for correlating information corresponding to multiple related frames on a web page are provided. In some embodiments, a method for identifying corresponding iframes on a web page to a server is provided, the method comprising: loading a web page including a plurality of iframes; receiving the requested content and identifying information for a first iframe; loading an event listener; determining a location of the first iframe in the structure of the web page; transmitting a message to a second iframe including the first identifying information and location of the first iframe; receiving, using the event listener, a message from the second iframe including second identifying information and location of the second iframe; determining that the second iframe is nested within the first iframe; and transmitting a third message to a server including at least the second identifying information and location of the second iframe.

18 Claims, 14 Drawing Sheets

Frames on Page
0. base-level page (e.g., top-level window)
1. non-nested advertisement
2. widget with two sub-frames
3. three-level nested advertisement with customized advertisement tag
4. two-level nested advertisement with customized advertisement pixel tag

SYSTEMS, METHODS, AND MEDIA FOR CORRELATING INFORMATION CORRESPONDING TO MULTIPLE RELATED FRAMES ON A WEB PAGE

TECHNICAL FIELD

The disclosed subject matter relates to systems, methods, and media for correlating information corresponding to multiple related frames on a web page.

BACKGROUND

Modern web pages often contain iframes and nested iframes which are used, for example, to facilitate presentation of content (such as advertisements) from other domains. Due to the same origin policy implemented by modern web browsers, content in an iframe that is from another domain is prevented from initiating certain actions on the top level domain of the web page, and in other iframes that have a different domain. While the same origin policy can inhibit content in an iframe from initiating certain malicious actions, it also inhibits the content loaded in the iframe from directly determining what other content is being presented on the web page, and from directly coordinating with content from other iframes.

Accordingly, it is desirable to provide methods, systems, and media for correlating information corresponding to multiple related frames on a web page.

SUMMARY

In accordance with various embodiments mechanisms for correlating information corresponding to multiple related frames on a web page are provided.

In accordance with some embodiments of the disclosed subject matter, a method for identifying corresponding iframes on a web page to a server is provided, the method comprising: loading a web page including a plurality of iframes; requesting first content for a first iframe of the plurality of iframes; receiving the requested content for the first iframe over the Internet and first identifying information; receiving instructions over the Internet to load an event listener in association with the first iframe; loading the event listener in association with the first iframe; determining a location of the first iframe in the structure of the web page; transmitting a first message to at least a second iframe of the plurality of iframes that includes at least the first identifying information and information identifying the location of the first iframe in the structure of the web page; receiving, using the event listener, a second message from the second iframe that includes at least second identifying information associated with the second iframe and information identifying a location of the second iframe in the structure of the web page; determining that the second iframe is nested within the first iframe based on the information identifying the location of the second iframe; and transmitting a third message to a server including at least the second identifying information, information identifying the location of the first iframe in the structure of the web page and information identifying the location of the second iframe in the structure of the web page.

In accordance with some embodiments of the disclosed subject matter, a system for identifying corresponding iframes on a web page to a server is provided, the system comprising: a hardware processor that is programmed to: load a web page including a plurality of iframes; request first content for a first iframe of the plurality of iframes; receive the requested content for the first iframe over the Internet and first identifying information; receive instructions over the Internet to load an event listener in association with the first iframe; load the event listener in association with the first iframe; determine a location of the first iframe in the structure of the web page; transmit a first message to at least a second iframe of the plurality of iframes that includes at least the first identifying information and information identifying the location of the first iframe in the structure of the web page; receive, using the event listener, a second message from the second iframe that includes at least second identifying information associated with the second iframe and information identifying a location of the second iframe in the structure of the web page; determine that the second iframe is nested within the first iframe based on the information identifying the location of the second iframe; and transmit a third message to a server including at least the second identifying information, information identifying the location of the first iframe in the structure of the web page and information identifying the location of the second iframe in the structure of the web page.

In accordance with some implementations of the disclose subject matter, a non-transitory computer-readable medium containing computer executable instructions that, when executed by a processor, cause the processor to perform a method for identifying corresponding iframes on a web page to a server is provided, the method comprising: loading a web page including a plurality of iframes; requesting first content for a first iframe of the plurality of iframes; receiving the requested content for the first iframe over the Internet and first identifying information; receiving instructions over the Internet to load an event listener in association with the first iframe; loading the event listener in association with the first iframe; determining a location of the first iframe in the structure of the web page; transmitting a first message to at least a second iframe of the plurality of iframes that includes at least the first identifying information and information identifying the location of the first iframe in the structure of the web page; receiving, using the event listener, a second message from the second iframe that includes at least second identifying information associated with the second iframe and information identifying a location of the second iframe in the structure of the web page; determining that the second iframe is nested within the first iframe based on the information identifying the location of the second iframe; and transmitting a third message to a server including at least the second identifying information, information identifying the location of the first iframe in the structure of the web page and information identifying the location of the second iframe in the structure of the web page.

In accordance with some implementations of the disclose subject matter, a system for identifying corresponding iframes on a web page to a server is provided, the system comprising: means for loading a web page including a plurality of iframes; means for requesting first content for a first iframe of the plurality of iframes; means for receiving the requested content for the first iframe over the Internet and first identifying information; means for receiving instructions over the Internet to load an event listener in association with the first iframe; means for loading the event listener in association with the first iframe; means for determining a location of the first iframe in the structure of the web page; means for transmitting a first message to at least a second iframe of the plurality of iframes that includes at least the first identifying information and information identifying the location of the first iframe in the structure of the web page; means for receiving, using the event listener, a second message from the second iframe that includes at least second identifying information associated with the second iframe and information identifying a location of the second iframe in the structure of the web page; means for determining that the second iframe is nested within the first iframe based on the information identifying the location of the second iframe; and means for transmitting a third message to a server including at least the second identifying information, information identifying the location of the first iframe in the structure of the web page and information identifying the location of the second iframe in the structure of the web page.

In some embodiments, the means for transmitting the first message to the second iframe comprises means for using the function window.postMessage to send the first message to the second iframe through the top level window of the web browser.

In some embodiments, the system further comprises: means for receiving, using the event listener, a fourth message from a third iframe that includes at least third identifying information associated with the third iframe and information identifying a location of the third iframe in the structure of the web page; means for determining that the first iframe is nested within the third iframe based on the information identifying the location of the third iframe; and wherein the third message also includes the third identifying information and information identifying the location of the third iframe in the structure of the web page.

In some embodiments, the second message and the fourth message each include timing information indicating when the respective message was sent.

In some embodiments, the system further comprises, means for determining a latency for the second message and the fourth message, respectively, based on a time when the message was received and the time when the message was sent, wherein the third message further includes the latency determined for each of the second message and the fourth message.

In some embodiments, the system further comprises means for formatting the third message such that information for the first frame comes after information for the third frame and information for the second frame comes after information for the first frame.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
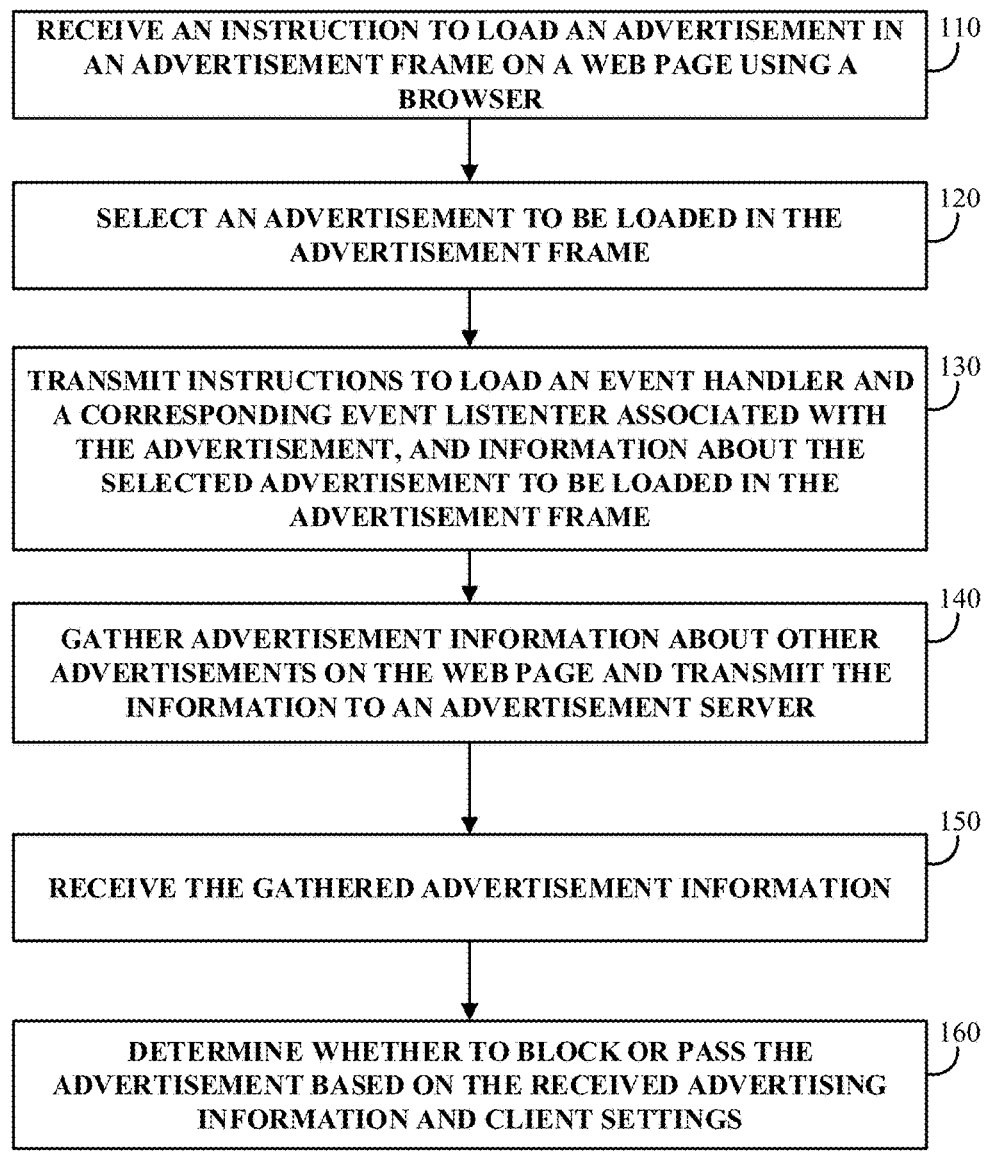
FIG. 1 shows an illustrative example of a process for detecting advertisements with advertising cues in accordance with some embodiments of the disclosed subject matter.

In accordance with various embodiments, mechanisms for detecting advertisements with advertising cues are provided. These mechanisms can include using advertising cues that provide an advertisement identification message. Using these advertising cues and advertisement identification messages, these mechanisms can exchange information between advertisements through an event listener, a message transmitter, an event handler, and/or an unload handler. These mechanisms can then transmit the exchanged advertisement information to an advertisement server that determines whether to pass an advertisement, block an advertisement, transmit a different advertisement, etc. Such an advertisement server can be a publisher advertisement server, a marketer advertisement server, a demand side platform, a supply side platform, an advertisement network, a real-time bidding exchange, or any suitable combination thereof.

These mechanisms can be used in a variety of applications. For example, these mechanisms can be used by a competing advertiser or a different advertisement server to determine whether to place an advertisement on a web page based on already placed or already served advertisements. In a more particular example, an advertisement server that is placing advertisements relating to American Airlines can detect advertisements that are shown on the web page. In the case where the advertisement server does not want to place an advertisement relating to American Airlines when an advertisement relating to JetBlue Airways has been presented on the same page (that may be provided by another advertisement server), the advertisement server can use the exchanged information to block the advertisement from being presented (competitive blocking). In the case where the advertisement server wants to place an American Airlines advertisement on the same page as the JetBlue Airways advertisement, the advertisements server can use the exchanged information to pass the advertisement (competitive targeting).

In another more particular example, an advertisement server can use the exchanged information to determine whether multiple advertisements relating to a client (e.g., American Airlines) have been placed on the same page. The client can provide desired settings as to how their advertisements are served (e.g., only one per web page, a desired percentage per website, etc.). In yet another example, an advertisement server can use the exchanged information to determine information relating to other advertisements that have been placed on the page. Such information can include identification information about other advertisements on the same page, frame, or any other suitable region, information regarding the nature of advertisements on the page, etc. In still another example, the response received from another advertisement can include, for example, a password, pass key, etc. which can be used to verify the information from the other advertisement, as well as prevent fraud.

Generally speaking, these mechanisms provide an advertisement guidance application (sometimes referred to herein as "the application") for detecting advertisements. More particularly, the application uses an event listener to listen for messages from other advertisements, a message transmitter to transmit messages to frames on a page, and an event handler to detect other advertisements and transmit advertisement identification messages within one or more web pages.

In some embodiments, the advertisement guidance application can receive an instruction to load an advertisement from a web browser loading a web page that contains instructions to load one or more advertisements. In general, a web page can contain content as well as instructions to load one or more advertisements. The instructions to load one or more advertisements can be, for example, an advertisement call or advertisement tag that instructs a web browser to request an advertisement from an advertisement server. In some cases, these instructions can be included in a frame within the web page, which can be an inline frame (iframe) that can allow documents from domains other than the domain of the web page to be loaded within the web page. Upon loading the web page, a web browser can request advertisements in response to the instructions contained in one or more iframes. For example, a user can navigate to a web page which can have instructions for loading advertisements in four frames of various sizes throughout the web page.

In some embodiments, an advertisement guidance application can select an advertisement to load on the web page in response to receiving a request to load an advertisement. The advertisement can be selected using any suitable techniques. For example, information about the content of the web page can be used to select an advertisement to be placed on the web page (e.g., content of the web page, traffic numbers for the web page, etc.), demographic or psychographic characteristics of a user of the web browser can be used to select an advertisement to be placed on the web page, an advertisement to be placed on the web page can be selected based on a number of impressions to be delivered for a particular advertisement, etc.

In some embodiments, the advertisement guidance application can cause an event handler and an event listener to be loaded on the web page for exchanging information with other advertisements on the web page. For example, the frame that requested that the advertisement be loaded can load the event handler and/or event listener, and the event handler and/or the event listener can send an advertising cue (e.g., an identification message) to other frames in the web page. More particularly, a function such as window.postMessage can be used to send a message to other frames (e.g., other iframes) within the web page. In some embodiments, communication between frames in a web page can include communication through a top-level window that contains the frames. Additionally, information about a selected advertisement can be transmitted to the web page to be used in exchanging advertisement information about selected advertisements with other advertisement frames. In some cases, the selected advertisements can be transmitted and/or loaded while information about the advertisements is being exchanged. In other cases, the selected advertisements are not transmitted and loaded until the advertisement guidance application determines that the selected advertisement should be passed.

In some embodiments, the advertisement guidance application can receive information about the advertisements that was gathered using the event handler and/or the event listener. For example, advertisement information (e.g., metadata) regarding the other advertisements that are loaded or will be loaded on the web page can be received by the advertisement guidance application.

In some embodiments, advertisement information about a selected advertisement and other advertisements on the web page can be used by the advertisement guidance application to determine whether to block the selected advertisement from being displayed on the web page or to pass the advertisement. For example, if the advertisement guidance application determines that the selected advertisement should be blocked, the advertisement guidance application can inhibit the advertisement from being transmitted to the web browser. In another example, if the selected advertisement has already been loaded, the advertisement guidance application can cause a new advertisement or other suitable content to be loaded in place of the selected advertisement. In some instances, this can be performed while loading the web page, after the advertisement has been loaded on the web page, prior to a subsequent advertisement being loaded on the web page, etc.

Turning to FIG. 1, an example of a process 100 for detecting advertisements and exchanging advertisement information is shown in accordance with some embodiments of the disclosed subject matter. As shown, the advertisement guidance application begins by receiving an instruction (or request) to load an advertisement in an advertisement frame on a web page at 110. The instruction to load an advertisement can be received from any suitable source. For example, a user can instruct a web browser to load a particular web page (e.g., by entering a uniform resource locator (URL), by selecting a hyperlink, etc.), and the web page can send an instruction from a particular frame to load an advertisement. In some embodiments, sending an instruction to load an advertisement can involve transmitting a request to an advertisement server that stores one or more advertisements. In some embodiments, the advertisement server can count the number of impressions for advertisements that are served to each web page, which may relate to how much the web page presenting the advertisement to the user is paid by the advertiser.

Figure 3A:
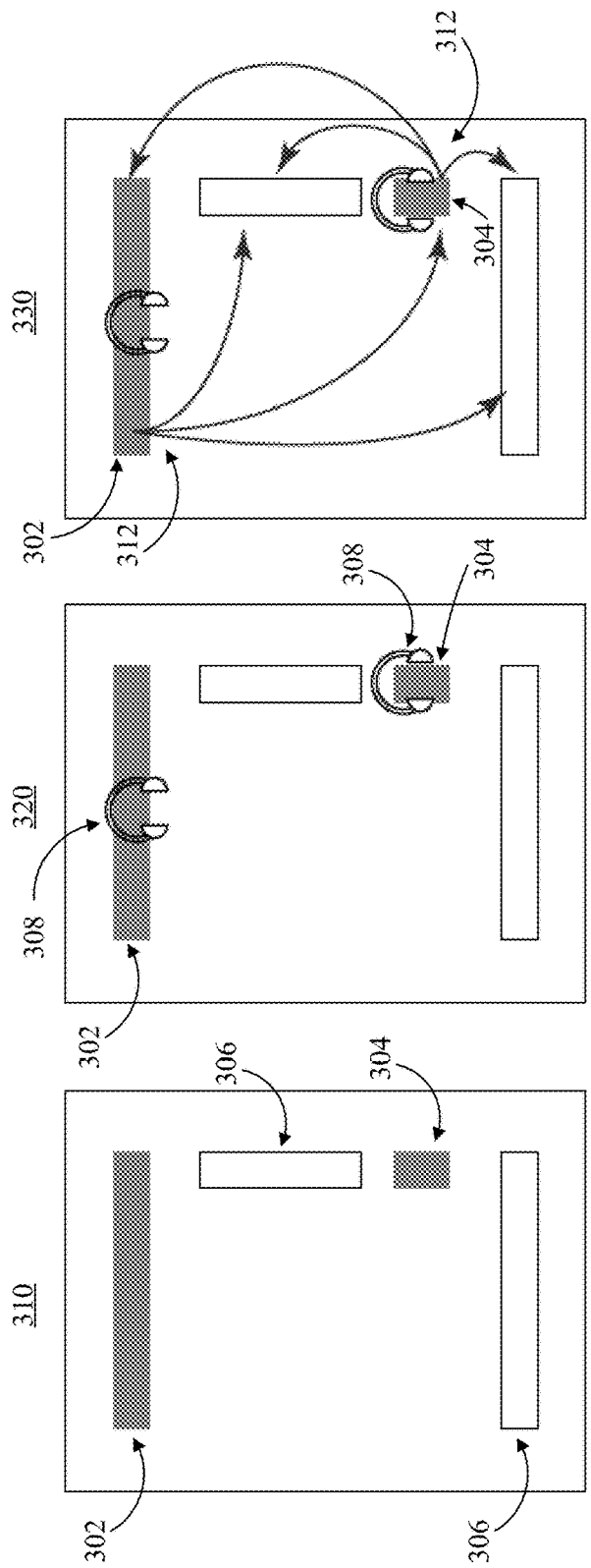
FIGS. 3A and 3B show diagrams illustrating an example of a process for detecting advertisements with advertising cues in accordance with some embodiments of the disclosed subject matter.

More particularly, as shown in window 310 of FIG. 3A, in response to receiving a request to load a particular web page, the web page requests advertisements in one or more advertisement frames (e.g., shown as frames 302, 304 and 306). The advertisements requested by some of these advertisement frames, such as advertisement frames 302 and 304, can be approved advertisements which can incorporate the mechanisms described herein and/or advertisements rated, qualified, and/or endorsed by any suitable advertising entity. For example, as described herein, frames 302 and 304 can send messages to other advertisements loaded on the web page, wait for a response, and send information to an advertisement server to assist the advertisement server in making decisions regarding whether to load an advertisement in frame 302 and/or 304. Additionally, some of these frames, such as frames 306, can correspond to advertisements that are not approved advertisements and are not compatible with the mechanisms described herein.

Returning to FIG. 1, in response to receiving the instruction (or request) to present an advertisement, the advertisement guidance application can select an advertisement to be loaded in the advertisement frame at 120. Any suitable technique can be used to select an advertisement to be loaded in the advertisement frame that requested an advertisement (e.g., frame 302). For example, information about the content of the web page can be used to select an advertisement to be placed on the web page (e.g., content of the web page, traffic numbers for the web page, a size of the advertisement frame, etc.). As another example, demographic or psychographic characteristics of a user of the web browser can be used to select an advertisement to be placed on the web page. As yet another example, an advertisement to be placed on the web page can be selected based on a number of impressions to be delivered for a particular advertisement.

At 130, the advertisement guidance application can transmit instructions to the advertisement frame to load an event handler and a corresponding event listener associated with the selected advertisement to be loaded. The advertisement guidance application can also transmit information about the selected advertisement (e.g., advertisement metadata) at 130. As described below in connection with FIG. 3A, information about the advertisement can include advertiser information, campaign information, etc.

In response to the instructions to load the event handler and event listener, the web browser that loaded the web page can load an event handler and event listener for the advertisement frame (e.g., frame 302). As shown more particularly in window 320 of FIG. 3A, an event handler (not shown) and a corresponding event listener (represented by icon 308) can be loaded for frames 302 and 304. Event listener 308 can wait for messages sent by other frames (e.g., other advertisements on the web page). For example, event listener 308 associated with frame 302 can listen for messages transmitted from other frames on the web page, such as frame 304, which may or may not have loaded an advertisement. In a more particular example, an event listener associated with a particular advertisement frame can listen for a message or cue from another advertisement frame. The message or cue can be text, such as "I am an approved advertisement," or any suitable text. In some embodiments, a format of an incoming message can be checked to determine whether it matches an expected format. Messages that do not match the expected format can be rejected and/or ignored.

In some embodiments, messages can be sent between advertisements using any suitable techniques. For example, in some embodiments, messages can be sent between iframes by sending messages through a higher level window that contains both iframes, such as a top-level window. In another example, messages can be sent from an event handler associated with a first browser window to advertisements (e.g., iframes) located in different windows and/or different portions of a web browser application in which the advertisements are loaded.

It should be noted that, in some embodiments, the advertisement selected at 120 can be transmitted for loading on the web page at 130. In such embodiments, the advertisement can be loaded and then replaced or blocked after loading, rather than waiting until the information has been gathered to determine whether to block or pass the advertisement.

Referring back to FIG. 1, at 140, advertisement information about other advertisements loaded (or selected to be loaded) on the web page can be gathered and transmitted to an advertisement server. In some embodiments, the advertisement information can be gathered by exchanging advertisement information among frames corresponding to approved advertisements using the event handler and event listener loaded in response to the instructions transmitted at 130.

Figure 2:
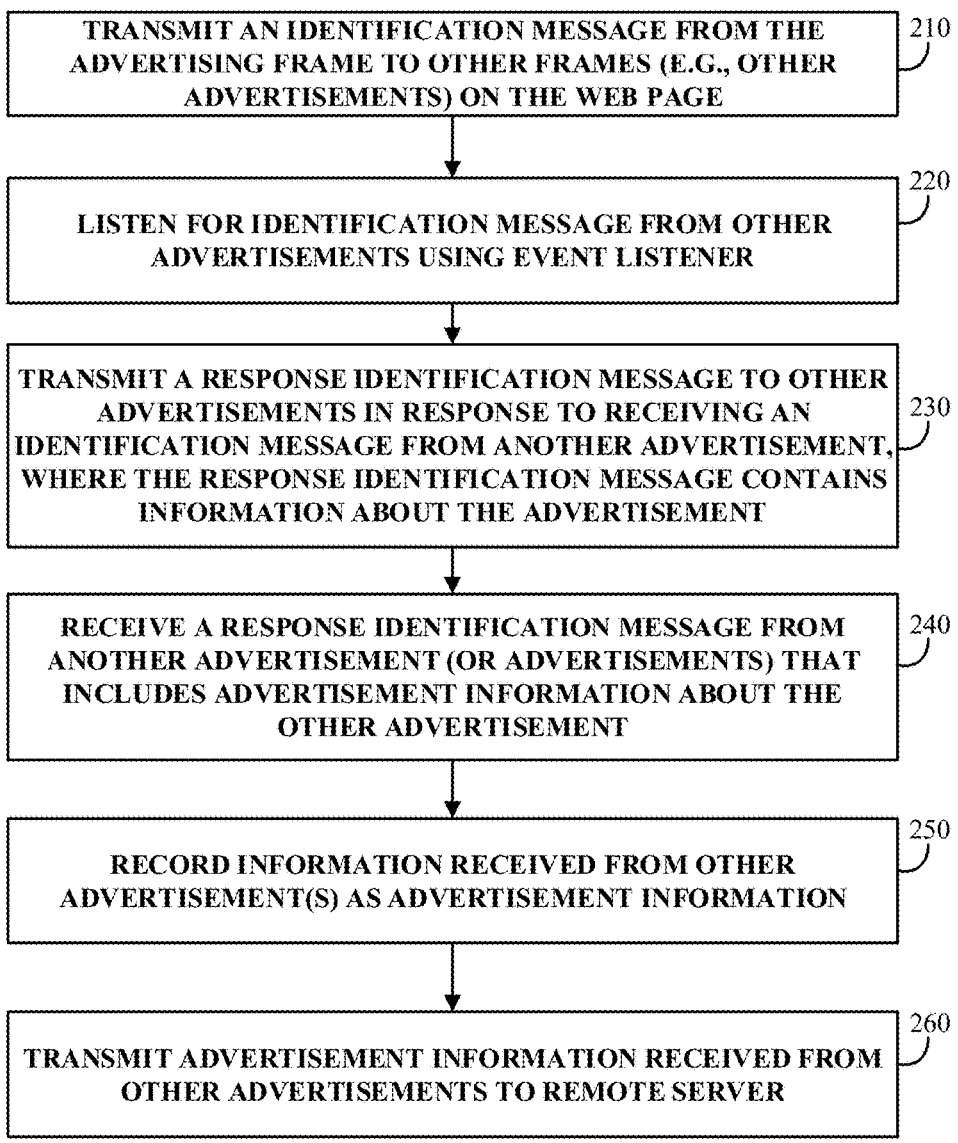
FIG. 2 shows an illustrative example of a process for exchanging information between advertisements with advertising cues in accordance with some embodiments of the disclosed subject matter.

FIG. 2 shows an illustrative flow diagram 200 for gathering information about other advertisements loaded (or selected to be loaded) on the web page loaded in the web browser in accordance with some embodiments of the disclosed subject matter. At 210, an identification message can be sent from a first advertising frame on the web page to one or more other frames on the web page. As described above, the identification message can be text, such as, "I am an approved advertisement," or any other suitable text. In some embodiments, the identification message can also contain additional information, such as, an identification number, a password or pass phrase, etc., that can be used to identify the advertisement frame as an approved advertisement. As described in connection with FIGS. 9 and 10, the identification message can include a frame map or any other suitable frame information relating to an advertisement. Such additional information can be used to verify the origin of the other advertisements and/or the information sent from such other advertisements. Additionally, the identification message can contain a domain associated with the advertising frame sending the message.

In some embodiments, the event handler, the event listener, a message transmitter, or any other suitable component associated with the advertisement or advertisement frame can transmit a message to advertisements in other frames on the web page. For example, as shown in window 330 of FIG. 3A, using window.postMessage or any other suitable HTML application program interface for transmitting data messages, the message transmitter can recursively walk through iframes or any other suitable elements in the page and transmit a message. Upon recursively walking through the iframes in the page, the message transmitter can transmit an advertising cue, such as, "I am an approved advertisement." For example, as shown in window 330 of FIG. 3A, the message transmitter associated with an advertisement can transmit an advertisement identification message 312 (e.g., "I am an approved advertisement") to each other advertisement on the page. Additionally or alternatively, the message can be encrypted such that the message can only be understood by an event listener that has access to a key to decrypt the message.

At 220, the event listener associated with the advertising frame can listen for identification messages from other advertisements and/or other advertisement frames on the web page. For example, as shown in windows 320 and 330 of FIG. 3A, event listener 308 associated with advertisement frame 302 can listen for identification messages from other advertisements (or advertisement frames) on the web page. Likewise, event listener 308 associated with advertisement frame 304 can listen for identification messages from other advertisements (or advertisement frames) on the web page.

In response to receiving an identification message from another advertisement (or advertisement frame), the event handler can respond to such identification messages at 230. For example, the event handler can cause a response identification message to be transmitted to the advertisement (or advertising frame) that transmitted the identification message. The response identification message can contain any suitable information about the advertisement to be loaded (or which has been loaded) in the advertisement frame sending the response identification message. For example, the response identification message can contain advertiser information (e.g., advertiser name, source, link, etc.), campaign information (e.g., campaign identification information), advertisement placement information (e.g., location on the page, browser configuration, screen resolution, etc.), and/or any other suitable information.

At 240, the event listener associated with the advertisement frame can receive a response identification from another advertisement (or advertisement frame) that includes advertisement information about the other advertisement (or an advertisement to be loaded in the advertisement frame). The event listener associated with the advertising frame can receive a response identification message from each advertisement (or advertisement frame) on the web page that has loaded an event listener and/or an event handler in accordance with the mechanisms described herein. As described above, the advertisement information can include advertiser information, campaign information, advertisement placement information, and/or any other suitable information.

In some embodiments, information on a total number of advertisements and/or frames on the web page can be gathered. For example, a number of identification messages sent can be used to represent a total number of advertisements on the web page.

As shown in window 330 of FIG. 3A (and described above), each advertisement frame loaded with an event handler (not shown) and an event listener 308 (e.g., frames 302 and 304) can transmit an identification message 312 to each other frame on the web page. In response, as shown in window 340 of FIG. 3B, each advertisement that received an identification message 312 can transmit a response identification message 314 back to the advertisement (or advertisement frame) that sent the original identification message 312. In the example of window 340, frames 302 and 304 exchange response identification messages 314.

At 250, the advertisement information received from other advertisements can be stored by the event handler associated with the advertising frame. For example, the advertisement information received at 240 can be stored in a cache associated with the browser as the advertisement information is received.

At 260, the advertisement guidance application or any suitable component of the application (e.g., the event handler, an unload handler, etc.) can cause the advertisement information received from other advertisements on the web page to be transmitted to a remote server. Such a remote server can include the advertisement server that caused the event handler and event listener to be loaded, a data server for storing data, a server that received the instruction to load an advertisement at 110, a server that intercepted such an instruction, any other suitable server, or any suitable combination thereof. For example, in some embodiments, as shown in window 350 of FIG. 3B, the event handler associated with the advertisement (e.g., advertisement 302) can send information received with the response identification message at 140 (e.g., information about advertisement 304) to the advertisement server as a message 316-1. Likewise, the event handler associated with another advertisement (e.g., advertisement 304) can send information received from the advertisement (e.g., advertisement 302) to an advertisement server (which may be the same advertisement server that message 316-1 was sent to or a different advertisement server) as a message 316-2. More particularly, the advertisement information associated with particular advertisements on a page can be transmitted to one or more servers by appending the information (e.g., as a message 316) to redirection instructions and/or any other suitable advertisement verification tags into advertisement calls. Redirection features are further described, for example, in commonly owned, commonly assigned U.S. Patent Application Publication No. 2011/0106634, which is hereby incorporated by reference herein in its entirety. Additionally, if the advertisement (e.g., advertisement 302) does not receive any response identification messages, the absence of approved advertisements can be transmitted to the advertisement server.

It should be noted that, in some embodiments, information can be gathered from advertisements located anywhere within a web page or web site on which an advertisement selected at 120 is loaded or is to be loaded, or advertisements that are located within other instances of a browser application, within other regions of a browser application. For example, information can be gathered from advertisements in different frames at the same level of a hierarchy as a frame within which the selected advertisement is loaded or to be loaded. As another example, information can be gathered from within the frame in which the advertisement is loaded or to be loaded using any suitable techniques. As yet another example, information can be gathered from frames at a different level of a hierarchy as a frame within which the selected advertisement is loaded or to be loaded, such as a top-level frame, a parent frame, a child frame, etc. As yet another example, information can be gathered from advertisements that are loaded or two be loaded within the same frame.

Referring back to FIG. 1, at 150, the advertisement guidance application can receive the advertisement information sent by the advertisement frame at 140. For example, the advertisement guidance application can receive message 316-1 from advertisement frame 302 that includes information about an advertisement to be loaded (or already loaded) in advertisement frame 304. It should be noted that the information received at 150 can be stored and/or analyzed to determine various properties of a particular web page on which the advertisement loaded and/or may be loaded. For example, information on other advertisements loaded on a web page can be stored. As another example, a number of frames within a particular web page can be stored. As yet another example, a proportion of frames that contain an advertisement using the mechanisms described herein can be stored. As still another example, information regarding how often advertisements are changed (e.g., how often advertisements reload) on the page on which the advertisement loaded can be stored. As a further example, information from a web page on which an advertisement appeared can be stored as together such that it can be determined at a later time which advertisements existed on the same web page at the same time. As another further example, information regarding a frame in which an advertisement is loaded (or is to be loaded) and that frame's position within a hierarchy, such as a position with a frame tree, can be stored along with information about the position of other frames position within the hierarchy. Such information can be used, for example, to determine a quantity of advertisements placed on a particular web page, an average amount of time that advertisements are loaded, a number of advertisements placed on a page at the same time, cost effectiveness of an advertisement campaign by a particular advertiser, to verify that advertisements appeared on web pages on which the advertiser intended advertisements to be placed on, etc.

At 160, the advertisement guidance application can determine whether to block or pass the advertisement based on the advertising information received at 150 and client settings related to the advertisement. For example, the advertisement server can receive the advertising information and determine whether to block the advertisement from being loaded or pass the advertisement and cause the advertisement to be loaded on the web page based on client settings. It should be noted that blocking is intended to include inhibiting the advertisement from being transmitted, as well as loading the advertisement on the web page and subsequently removing or replacing the advertisement if the advertisement guidance application determines that the advertisement should be blocked at 160. For example, if the advertisement guidance application determines that the advertisement selected at 120 should be blocked, a new advertisement can be transmitted to replace the advertisement that has already been loaded. As another example, if the advertisement guidance application determines that the advertisement selected at 120 should be blocked, instructions can be sent to unload the advertisement that was selected at 120 and to request a new advertisement from any suitable location, such as a real-time bidding application, a server for storing public service announcements, etc.

In some embodiments, client settings can include, for example, competitive blocking instructions that direct the advertisement server to block the advertisement if an advertisement from a competitor in the same industry has placed an advertisement on the same page, competitive targeting instructions that direct the advertisement server to pass the advertisement if an advertisement from a competitor in the same industry has placed an advertisement on the same page, count instructions that direct the advertisement server to provide a particular number or percentage of particular advertisements associated with the client on a page, etc. More particularly, the client (e.g., an advertiser) can provide settings such that the same advertisement is not presented multiple times or multiple times within a given time period on a page. In doing this, the client can control costs associated with the presentation of their advertisements.

Figure 3B:
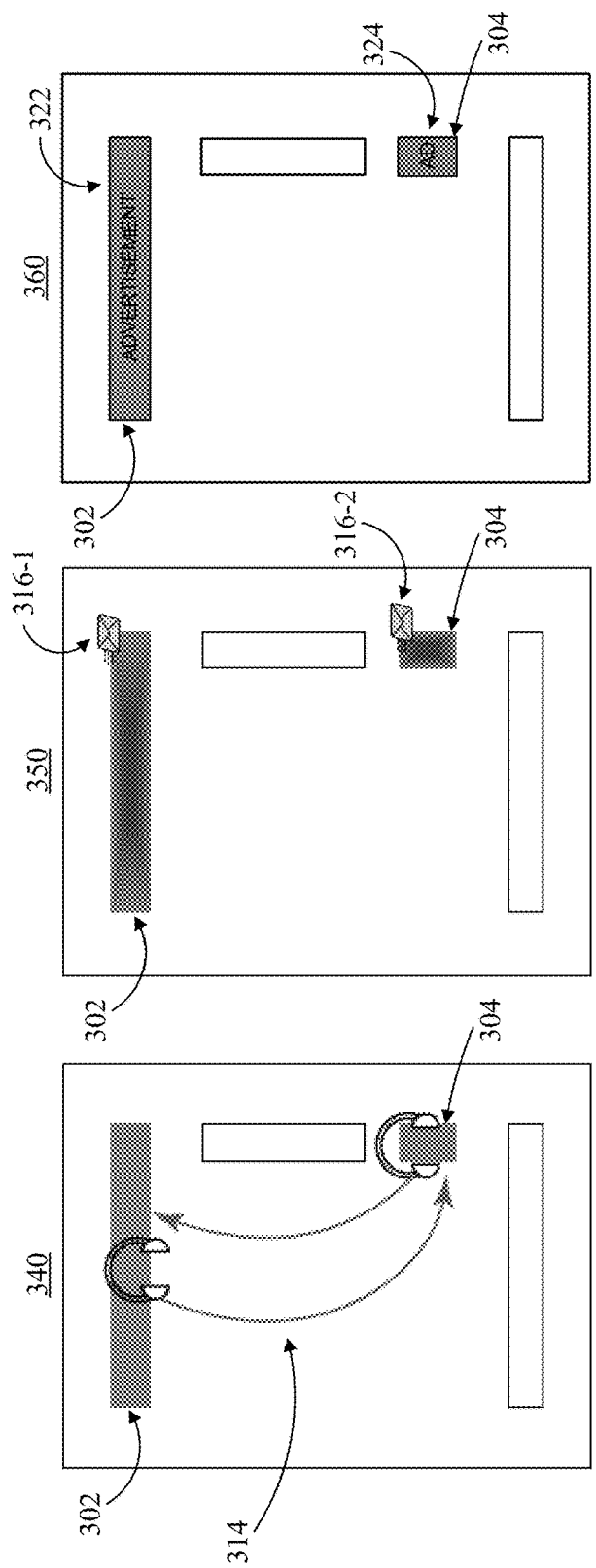

As shown in window 360 of FIG. 3B, if the advertisement guidance application passes the advertisement, an advertisement 322 (e.g., a creative such as an image, a video, text, sound, a combination thereof, etc.) can be loaded in advertising frame 302. A similar decision regarding advertisement frame 304 can be made by the advertisement guidance application about whether to block or pass the advertisement (on the same advertising server or a different advertising server), and if an advertisement is passed for advertisement frame 304, an advertisement 324 can be loaded in advertisement frame 304.

In some embodiments, an unload handler can be set up for an advertisement that allows additional information that is collected from advertisements that loaded later in time to be transmitted to the advertisement server or any other suitable server. For example, the advertisement server can receive information related to advertisement identification messages between advertisements that load after the advertisement is initially loaded. More particularly, if the advertisement receives an identification message after the advertisement has been passed to the web page and loaded, the advertisement can then send an identification message back to the advertisement that transmitted the identification message. As described above in connection with FIGS. 1 to 3, the advertisement can receive a response identification message that contains information about another advertisement that is loaded after the advertisement is passed (e.g., after the advertisement loaded in response to the request at 110 has already been loaded). This information about the advertisement that was loaded later can be sent to the advertisement server (or any other suitable server) upon receipt of the information or can be stored and sent to the advertisement server (or any other suitable server) by the unload handler upon the advertisement and/or web page being unloaded (e.g., navigated away from, closed, refreshed, etc.).

In some embodiments, the unload handler can transmit the exchanged information and/or any other information gathered in association with the advertisement (e.g., advertisement viewability information, advertisement placement information, parent domain information, etc.) with which the unload handler is associated at any suitable time. For example, the unload handler can transmit such information to an advertisement server periodically. As another example, the unload handler can transmit such information in response to an event, such a beforeunload event, an unload event, a reload event, etc.

It should be noted that although information is generally described as flowing from the advertisement to an advertisement server, the advertisement server and/or any other suitable source can transmit information to the advertisement at any suitable time. For example, an advertisement server can transmit instructions to transmit information back to the advertisement server in response to an external event, such as the advertisement being loaded on a different web page. As another example, the advertisement server can transmit instructions to resend a message to other frames on the web page.

As described above, the advertisement guidance application can be used in any suitable application. For example, the advertisement server can use the advertisement information to determine advertising shares or counts. In a more particular example, the advertisement guidance application can be used by the advertisement server to block an advertisement if more than one advertisement from a single brand or single advertiser has been presented on a page. In another example, the advertisement guidance application can be used by the advertisement server to detect whether multiple advertisements were served on a page and to transmit a report when the multiple advertisements were not presented. In yet another example, the advertisement guidance application can be used by the advertisement server to provide advertisements in accordance with client settings (e.g., one advertisement per page, one of the same advertisements per page, ten percent per page, etc.). In still another example, the advertisement guidance application can be used to verify that advertisements have been placed by various advertisement servers by storing the received advertisement information, domain of a web page where the advertisement was loaded, time, etc.

Moreover, the advertisement server can use the advertisement guidance application and the exchanged information for competitor blocking or competitor targeting when advertisements on a page are being served by multiple advertisement servers. For example, an advertisement server that is placing advertisements relating to American Airlines can detect other advertisements that are shown on the web page and, upon receiving information relating to the detected advertisements, determine whether to provide the American Airlines advertisement to the page. In the case where the advertisement server has been instructed to not place an American Airlines advertisement when advertisements in the same industry or same genre have been presented on the page (e.g., competitive blocking), the advertisement server can use the exchanged information to block the advertisement from being presented. In the case where the advertisement server has been instructed to target pages with advertisements in the same industry or same genre (e.g., competitive targeting), the advertisement server can use the exchanged information to pass the advertisement.

In some embodiments, the advertisement guidance application can handle conflicts based on any suitable criteria. For example, in the case of conflicting instructions (e.g., block advertisements associated with entity A and block advertisements with entity B), the advertisement guidance application can use competitive targeting or competitive blocking information based on the advertisement that was loaded first on the page. In another example, in some embodiments, the advertisement guidance application can select another advertisement for placement on the page in response to receiving conflicting instructions.

In some embodiments, the advertisement server can use the application and the exchanged information to selectively present advertisements based on client settings. For example, the client can instruct the advertisement server to only place an advertisement on a page if the other advertisements served on the page have been rated as safe advertisements by, for example, Integral Ad Science, Inc. or any other suitable advertisement rating organization. Additionally or alternatively, the advertisement server can be instructed to use the application to determine whether a particular percentage of advertisements on a page are above a predetermined rating or score and, upon performing the determination, presenting the advertisements on the page.

Figure 4:
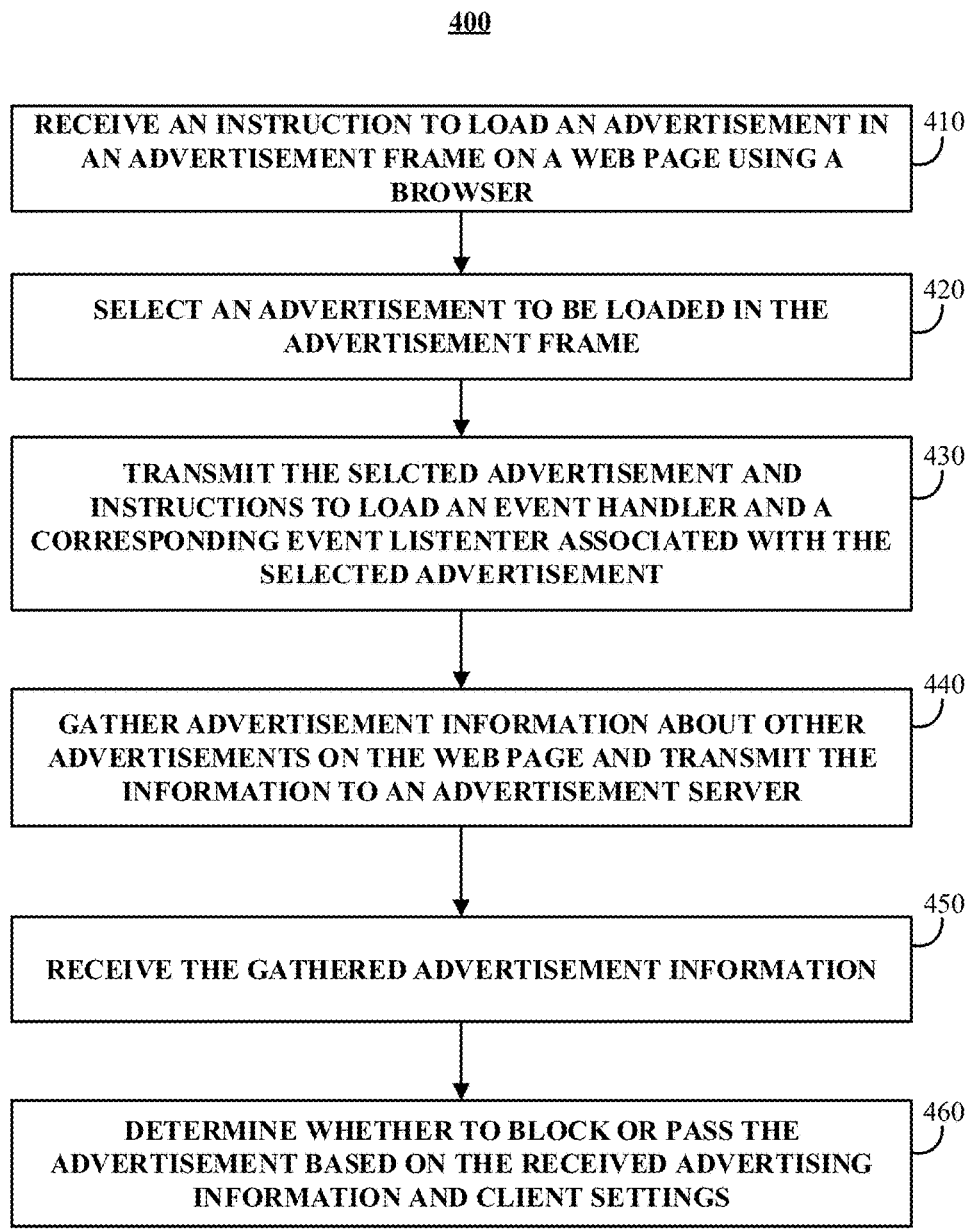
FIG. 4 shows an illustrative example of a process for detecting advertisements with advertising cues in accordance with some embodiments of the disclosed subject matter.

Turning to FIG. 4, an example of a process 400 for detecting advertisements and exchanging advertisement information is shown in accordance with some embodiments of the disclosed subject matter. As shown in FIG. 4, process 400 can begin by the advertisement guidance application receiving an instruction (or request) to load an advertisement on a web page using a browser at 410. Such receiving can be performed similarly to the receiving described above in connection with process 100 of FIG. 1. For example, the advertisement guidance application can receive a request for an advertisement from a web browser application at an advertisement server.

At 420, an advertisement to be loaded on the web page can be selected by the advertisement guidance application. Selection of an advertisement can be performed in accordance with selection of an advertisement described above in connection with process 100 of FIG. 1. For example, an advertisement can be selected based on demographic characteristics and/or psychographic characteristics of a user, content of the web page, etc.

At 430, the advertisement guidance application can transmit the selected advertisement and instructions to load an event handler and a corresponding event listener associated with the advertisement. The advertisement guidance application can also transmit information about the advertisement (e.g., advertisement metadata) to be stored in connection with the selected advertisement at 130. As described above in connection with FIG. 2, information about the advertisement can include advertiser information, campaign information, etc. The advertisement, the event handler and the corresponding event listener can all be loaded on the web page in response to the transmission of the selected advertisement and the instructions to load the event handler and the event listener.

At 440, advertisement information about other advertisements loaded on the web page can be gathered and transmitted to an advertisement server. This can be done as described above in connection with FIG. 2. For example, the advertisement can send an identification message to other frames on the web page and can receive a response identification message from other approved advertisements on the web page containing information about the other approved advertisements. The advertisement can also transmit advertisement information to the advertisement guidance application at 440.

At 450, the advertisement guidance application can receive the advertisement information sent by the advertisement at 440. For example, advertisement information can be transmitted to the advertisement server as described above in connection with FIGS. 1 and 3. More particularly, the advertisement guidance application can receive message 316-1 from advertisement 302 that includes information about advertisement 304.

At 460, the advertisement guidance application can determine whether to block or pass the advertisement based on the advertising information received at 450 and client settings related to the advertisement. For example, if the advertisement guidance application blocks the selected advertisement another advertisement can be loaded in place of the blocked advertisement. As another example, if the advertisement guidance application blocks the selected advertisement, the blocked advertisement can be replaced with a generic document (e.g., a blank document, a public domain image, etc.) or a public service announcement.

Process 400 is similar to process 100, but differs in that at 430, rather than only transmitting information about an advertisement to be loaded, as is done at 130, the advertisement is actually transmitted to the web page and loaded.

Figure 5:
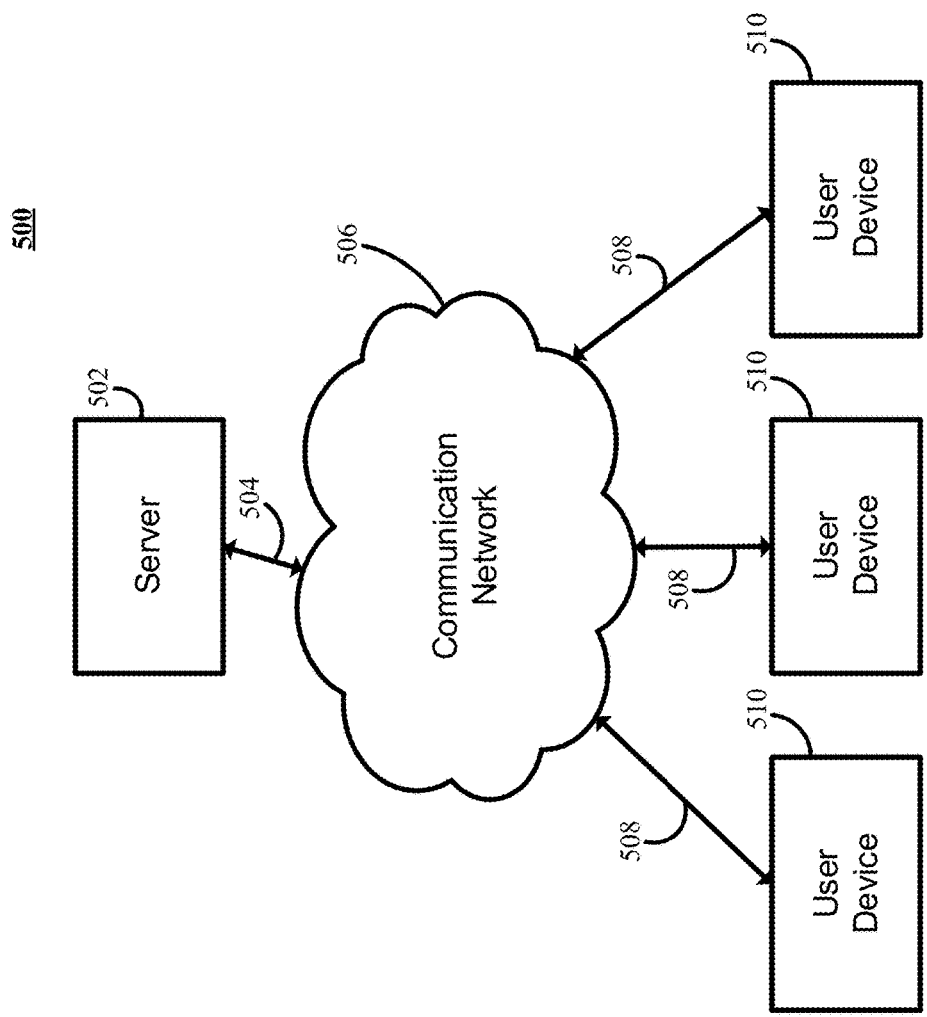
FIG. 5 shows a schematic diagram of an illustrative system suitable for implementation of an application for detecting advertisements with advertising cues in accordance with some embodiments of the disclosed subject matter.

FIG. 5 shows an example of a generalized schematic diagram of a system 500 on which the mechanisms for detecting advertisements with advertising cues described herein can be implemented as an application in accordance with some embodiments. As illustrated, system 500 can include one or more user devices 510. User devices 510 can be local to each other or remote from each other. User devices 510 can be connected by one or more communications links 508 to a communications network 506 that can be linked via a communications link 506 to a server 502.

System 500 can include one or more servers 502. Server 502 can be any suitable server for providing access to the application, such as a processor, a computer, a data processing device, or any suitable combination of such devices. For example, the application can be distributed into multiple backend components and multiple frontend components or interfaces. In a more particular example, backend components, such as data collection and data distribution can be performed on one or more servers 502. As described above, advertisement server 502 can be an advertisement server(s), a demand side platform server(s), a real-time bidding exchange server(s), etc., or any suitable combination thereof.

More particularly, for example, each of the user devices 510 and server 502 can be any of a general purpose device such as a computer or a special purpose device such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 510 can be implemented as a personal computer, a smartphone, a tablet computer, a personal data assistant (PDA), a multimedia terminal, a mobile telephone, a set-top box, a television, a game console, etc.

Communications network 506 can be any suitable computer network or combination of networks, such as, the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"). Communications links 504 and 508 can be any communications links suitable for communicating data between user devices 510 and server 502, such as network links, dial-up links, wireless links, hard-wired links, any other suitable communications links, or any suitable combination of such links. User devices 510 can enable a user to load a web page that causes features of the application to be accessed. User devices 510 and server 502 can be located at any suitable location.

Figure 6:
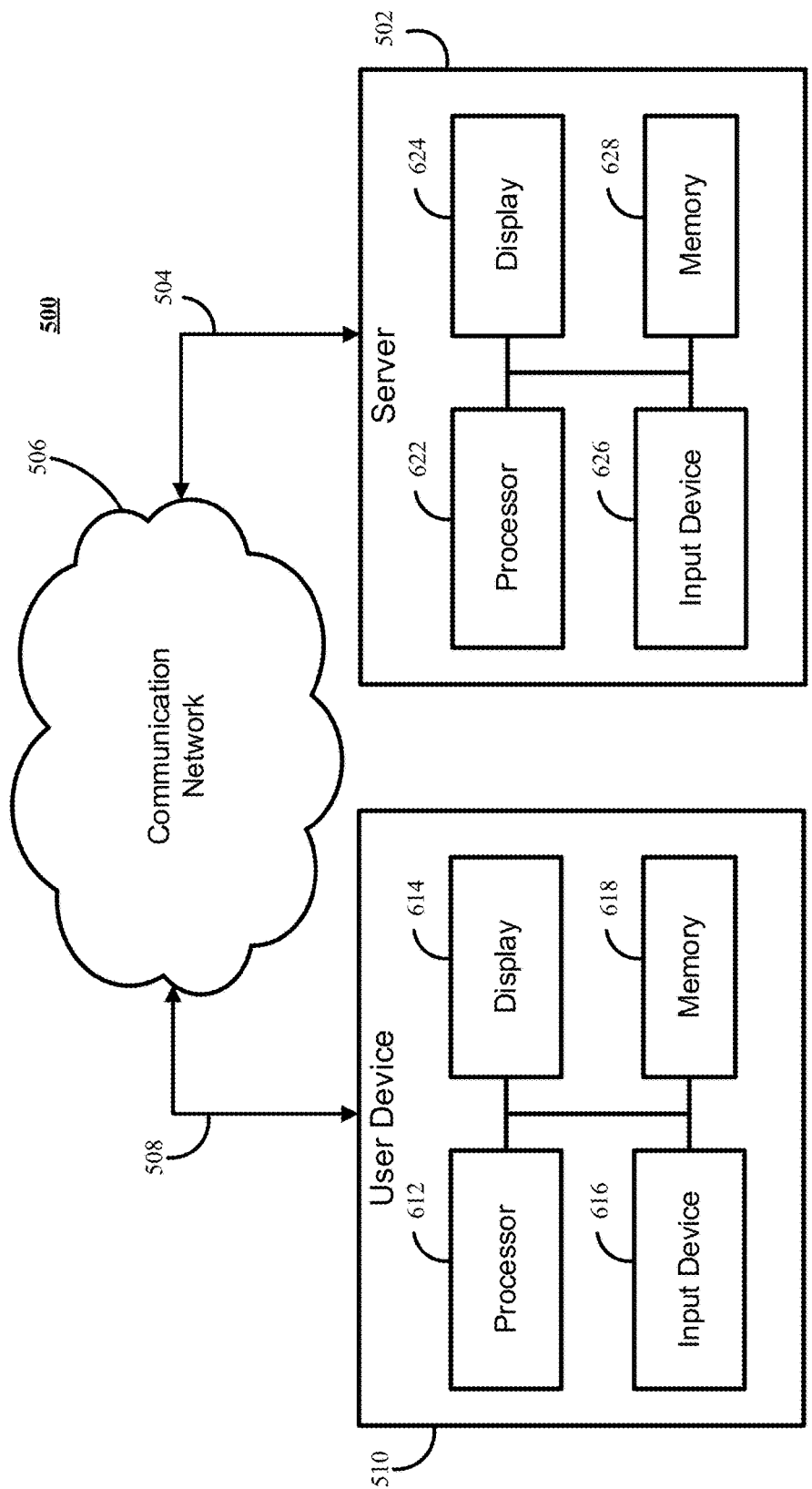
FIG. 6 shows a detailed example of the server and one of the user devices of FIG. 5 that can be used in accordance with some embodiments of the disclosed subject matter.

FIG. 6 illustrates an example of hardware 500 where the server and one of the user devices depicted in FIG. 5 are illustrated in more detail. Referring to FIG. 6, user device 510 can include a processor 612, a display 614, an input device 616, and memory 618, which can be interconnected. In some embodiments, memory 618 can include a storage device (such as a computer-readable medium) for storing a computer program for controlling processor 612.

Processor 612 can use the computer program to present on display 614 a web browser window that loads a web page with instructions to load an advertisement and/or other data received through communications link 508 and commands and values transmitted by a user of user device 510. It should also be noted that data received through communications link 508 or any other communications links can be received from any suitable source. Input device 616 can be a computer keyboard, a cursor-controller, dial, switchbank, lever, touchscreen, any other suitable input device, or any suitable combination thereof.

Server 502 can include processor 622, display 624, input device 626, and memory 628, which can be interconnected. In some embodiments, memory 628 can include a storage device for storing data received through communications link 504 or through other links, and can also receive commands and values transmitted by one or more users. The storage device can further include a server program for controlling processor 622.

In one particular embodiment, the application can include client-side software, hardware, or both. For example, the application can encompass a computer program written in a programming language recognizable by the computing device (e.g., user device, server, etc.) executing the application (e.g., via any suitable encoding, such as Java, C, Objective-C, C++, C#, Javascript, Adobe Flash, ActionScript, Visual Basic, HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Figure 7:
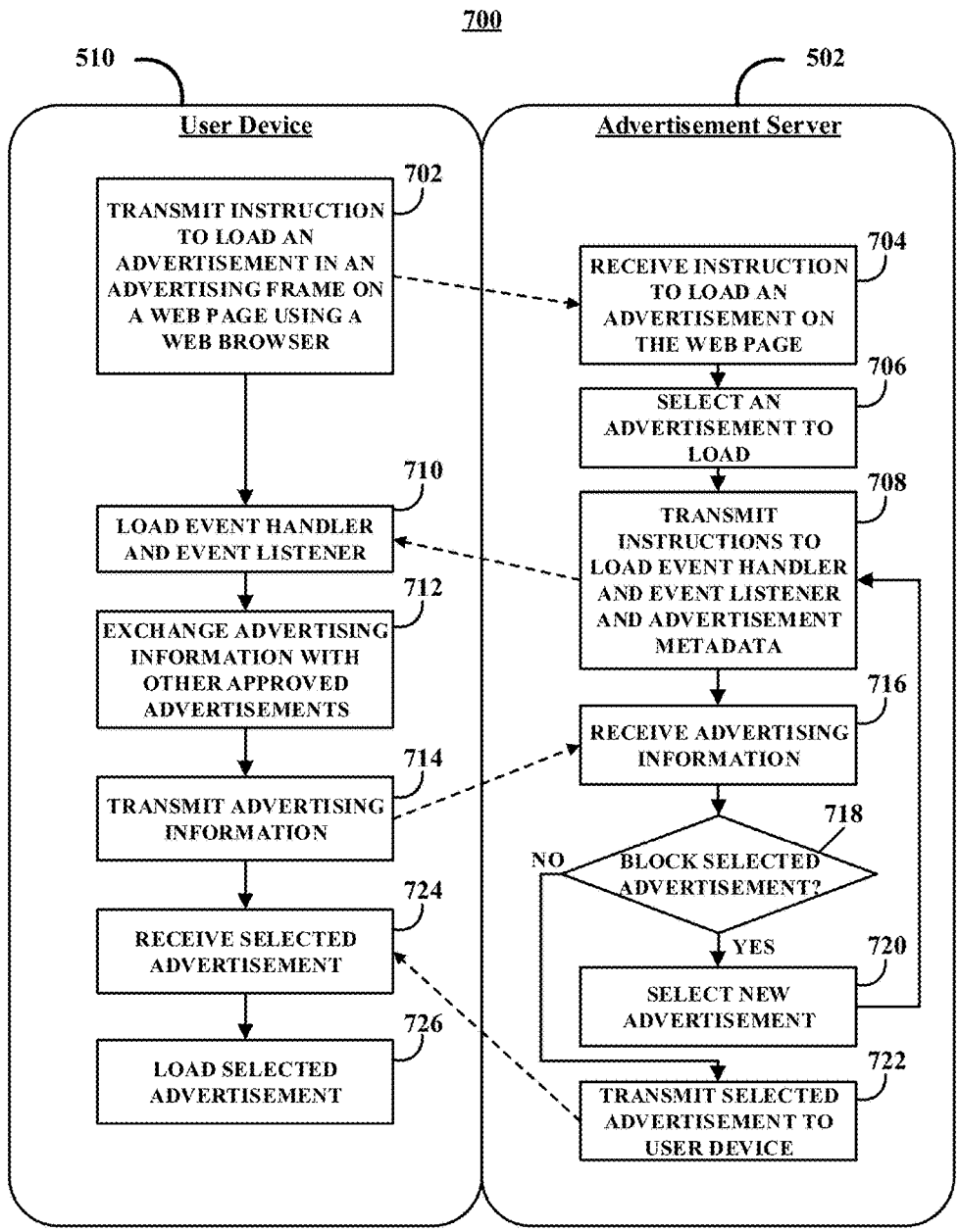
FIG. 7 shows a diagram illustrating an example of a data flow that can be used in processes of FIGS. 1 and 2 in accordance with some embodiments of the disclosed subject matter.

FIG. 7 shows an example of a data flow 700 between user device 510 and server 502 in accordance with some embodiments of the disclosed subject matter. In the example of FIG. 7, server 502 can be an advertising server. At 702, an instruction (or request) to load an advertisement on a web page can be transmitted to advertisement server 502 using a web browser running on user device 510. For example, a user can instruct the web browser to load a web page which can cause the web browser to request an advertisement to load on the web page. In one particular example, a user using user device 510 can select a link to example.com, which can cause a web browser on user device 510 to begin loading example.com. Example.com can contain a frame (e.g., an iframe) that contains instructions (such as an advertisement call, an advertisement tag, etc.) that instruct the web browser to request an advertisement from an advertisement server. The web browser in this example can send an instruction (or request) to an advertisement server specified by the instructions contained in the frame.

At 704, the advertisement guidance application running on advertisement server 502 can receive the instruction to load an advertisement on the web page. At 706, the advertisement guidance application can select an advertisement to load in response to receiving the instruction (or request) to load an advertisement on the web page. For example, as described above an advertisement can be selected based on the content of the web page, demographic or psychographic characteristics of the user, etc. In one particular example, an advertisement for American Airlines can be selected as the selected advertisement based on the user's demographic characteristics and the content of example.com.

At 708, the advertisement guidance application can cause advertising server 502 to transmit instructions to user device 510 to load an event handler and a corresponding event listener in the advertising frame on the web page. The advertisement guidance application can also cause advertising server 502 to transmit advertisement metadata (e.g., information about the advertisement) for the selected advertisement to user device 510 for use in exchanging advertisement information. In one particular example, the advertisement guidance application transmits instructions for the web browser running on user device 510 that loaded (or is still loading) example.com to load an event handler and event listener in the frame that contained the instructions to request an advertisement. In this example, the advertisement guidance application can also transmit metadata related to the selected advertisement, which in this case is an advertisement for American Airlines.

At 710, the web browser running on user device 510 can load an event handler and a corresponding event listener in the advertising frame that caused the advertisement to be requested.

At 712, the advertising frame, using the event handler and the event listener, can exchange advertising information with other advertisements and/or advertising frames on the web page. Exchanging advertising information can be performed as described above regarding gathering advertising information in connection with FIGS. 1 to 3. In one particular example, the frame that requested the advertisement from advertisement server 502 (e.g., the frame which will load the American Airlines advertisement if that advertisement is not blocked by the advertisement guidance application) can send an identification message to other frames on example.com (as loaded by the web browser running on user device 510). In such an example, the advertisement information gathered can contain information about one other advertisement on the web page loaded by the web browser running on user device 510.

At 714, the advertising frame can cause the web browser running on user device 510 to transmit the advertisement information (e.g., advertisement metadata) relating to other advertisements loaded (or selected to be loaded) on the web page. In one particular example, information related to one other advertisement on the web page can be transmitted to advertising server 502.

At 716, advertising server 502 can receive the advertising information from user device 510 and can use the advertisement information to determine whether to block the selected advertisement from loading on the web page at 718. The advertisement guidance application can determine whether to block the selected advertisement at 718 as described above in connection with FIG. 1. For example, if the advertisement information received at 716 indicates that an advertisement loaded on the web page is an advertisement from a competitor and the client has set up the advertisement guidance application for competitive blocking, the advertisement guidance application can determine that the selected advertisement should be blocked from loading on the web page. In one particular example, if the other advertisement on example.com is an advertisement for JetBlue Airways and the client associated with the selected advertisement (e.g., American Airlines, a party affiliated with American Airlines, etc.) has set the advertisement guidance application to perform competitive blocking, the advertisement guidance application can determine that the selected advertisement (e.g., the American Airlines advertisement) should be blocked. Changing the example slightly, if the client associated with the selected advertisement has set the advertisement guidance application to perform competitive targeting, the advertisement guidance application can determine that the selected advertisement (e.g., the American Airlines advertisement) should be passed (e.g., not blocked).

If the advertisement guidance application determines that the selected advertisement should be blocked ("YES" at 718), the advertisement identification application can select a new advertisement at 720 and return to 708. Otherwise, if the advertisement guidance application determines that the selected advertisement should be passed (e.g., should not be blocked) ("NO" at 718), the advertisement guidance application can cause advertisement server 502 to transmit the selected advertisement to user device 510.

At 724, user device 510 can receive the selected advertisement and the web browser can load the selected advertisement in the web page at 726. In one particular example, the advertisement guidance application can cause the advertisement server 502 to transmit the selected advertisement (e.g., the American Airlines advertisement) to user device 510 which can load the advertisement in example.com using the web browser.

Figure 8:
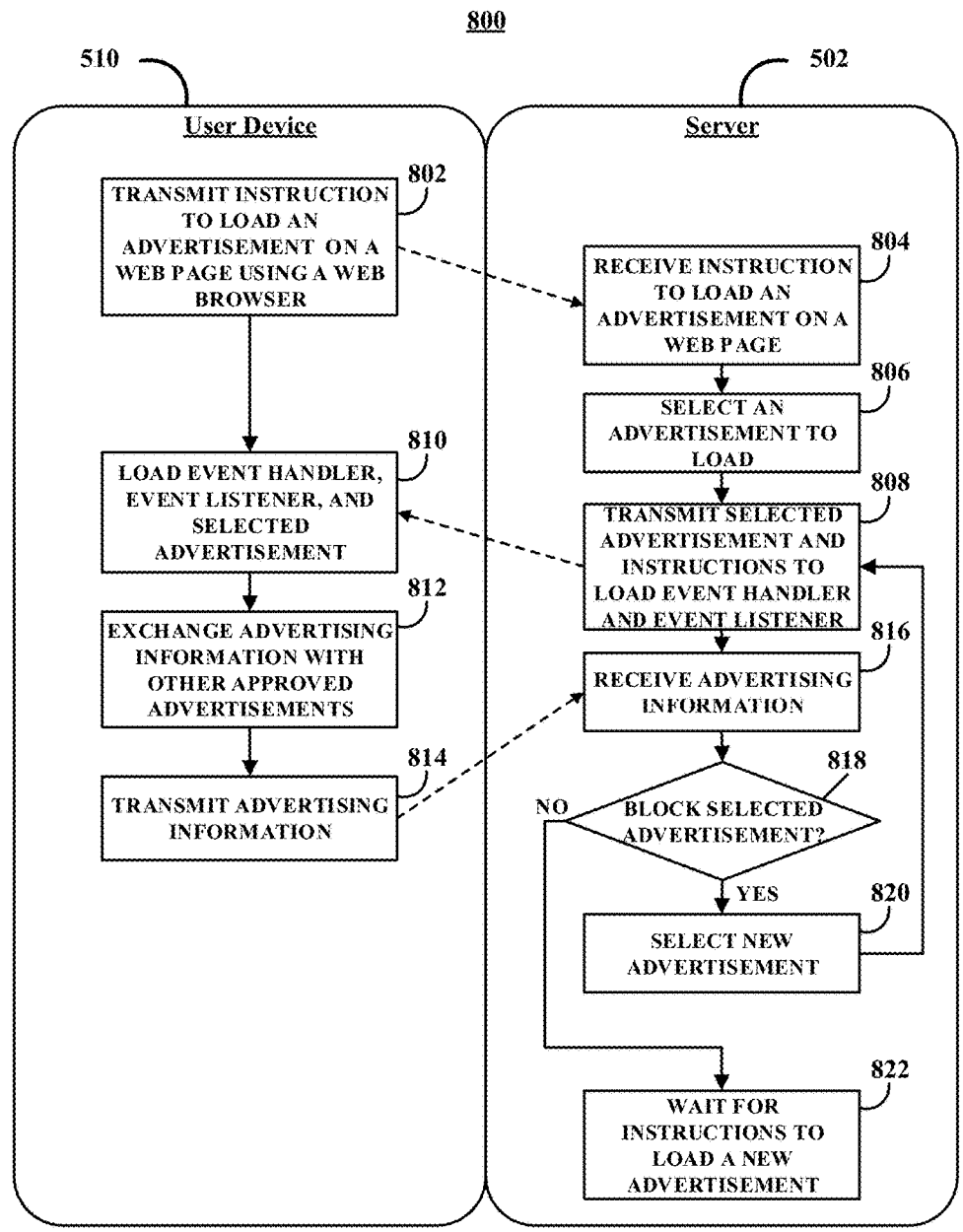
FIG. 8 shows a diagram illustrating an example of a data flow that can be used in processes of FIGS. 2 and 5 in accordance with some embodiments of the disclosed subject matter.

FIG. 8 shows an example of a data flow 800 between user device 510 and server 502 in accordance with some embodiments of the disclosed subject matter. In the example of FIG. 8, server 502 can be an advertising server. At 802, an instruction (or request) to load an advertisement on a web page can be transmitted to advertisement server 502 using a web browser running on user device 510. For example, a user can instruct the web browser to load a web page and the web page can cause the web browser to request an advertisement to load on the web page. In one particular example, a user using user device 510 can select a link to example-.com, which can cause a web browser on user device 510 to begin loading example.com. Example.com can contain a frame (e.g., an iframe) that contains instructions (such as an advertisement call, an advertisement tag, etc.) that instruct the web browser to request an advertisement from an advertisement server. The web browser in this example can send an instruction (or request) to an advertisement server specified by the instructions contained in the frame.

At 804, the advertisement guidance application running on advertisement server 502 can receive the instruction to load an advertisement on the web page. At 806, the advertisement guidance application can select an advertisement to load in response to receiving the instruction (or request) to load an advertisement on the web page. For example, as described above an advertisement can be selected based on the content of the web page, demographic or psychographic characteristics of the user, etc. In one particular example, an advertisement for American Airlines can be selected as the selected advertisement based on the user's demographic characteristics and the content of example.com.

At 808, the advertisement guidance application can cause advertising server 502 to transmit the selected advertisement and instructions to load an event handler and a corresponding event listener with the selected advertisement on the web page to user device 510. The advertisement guidance application can also cause advertising server 502 to transmit advertisement metadata (e.g., information about the advertisement) for the selected advertisement to user device 510. In one particular example, the advertisement guidance application transmits the selected advertisement (e.g., the American Airlines advertisement) and instructions for the web browser running on user device 510 that loaded (or is loading) example.com to load an event handler and event listener in the frame that contained the instructions to request an advertisement. In this example, the advertisement guidance application can also transmit metadata related to the selected advertisement, which in this case is an advertisement for American Airlines.

At 810, the web browser running on user device 510 can load an event handler and a corresponding event listener with the advertisement. In one particular example, the advertisement for American Airlines can be loaded on example.com by the web browser, and an event handler and a corresponding event listener can be loaded in associated with the American Airlines advertisement.

At 812, the advertisement, using the event handler and the event listener, can exchange advertising information with other advertisements and/or advertising frames on the web page. Exchanging advertising information can be performed as described above regarding gathering advertising information in connection with FIGS. 1, 3 and/or 4. In one particular example, the selected advertisement (e.g., the American Airlines advertisement) can send an identification message to other frames on example.com in the web browser. In such an example, the advertisement information can contain information about one other advertisement (e.g., an advertisement for JetBlue Airways, a competitor of American Airlines) on the web page loaded by the web browser running on user device 510.

At 814, the advertisement can cause the web browser running on user device 510 to transmit the advertisement information (e.g., advertisement metadata) relating to other advertisements loaded on the web page. In one particular example, information related to one other advertisement (e.g., a JetBlue Airways advertisement) on the web page can be transmitted to advertising server 502.

At 816, advertising server 502 can receive the advertising information from user device 510 and can use the advertisement information to determine whether to block the selected advertisement on the web page at 818. The advertisement guidance application can determine whether to block the selected advertisement at 818 as described above in connection with FIG. 4. For example, if the advertisement information received at 816 indicates that an advertisement loaded on the web page is an advertisement from a competitor and if the client has set up the advertisement guidance application for competitive blocking, the advertisement guidance application can determine that the selected advertisement should be blocked on the web page.

In one particular example, if the other advertisement on example.com is an advertisement for JetBlue Airways and the client associated with the selected advertisement (e.g., American Airlines, a party affiliated with American Airlines, etc.) has set the advertisement guidance application to perform competitive blocking, the advertisement guidance application can determine that the selected advertisement (e.g., the American Airlines advertisement) should be blocked. Changing the example slightly, if the client associated with the selected advertisement has set the advertisement guidance application to perform competitive targeting, the advertisement guidance application can determine that the selected advertisement (e.g., the American Airlines advertisement) should be passed (e.g., not blocked). In such an example, a new advertisement can be selected at 820 and at 808 the advertisement guidance application can cause the newly selected advertisement to be transmitted by advertisement server 502 to user device 510 to be loaded in example.com by the web browser running on user device 510.

If the advertisement guidance application determines that the selected advertisement should be blocked ("YES" at 818), the advertisement guidance application can select a new advertisement at 820 and return to 808. Otherwise, if the advertisement guidance application determines that the selected advertisement should be passed (e.g., should not be blocked) ("NO" at 818), the advertisement guidance application can wait for an instruction (or request) to load a new advertisement.

At 810, if the selected advertisement is blocked and a new advertisement is selected and transmitted by advertising server 502, user device 510 can receive the newly selected advertisement and the web browser can load the newly selected advertisement in the web page at 810. In one particular example, the advertisement guidance application can cause the advertisement server 502 to transmit a newly selected advertisement (e.g., an advertisement for Burger King) to user device 510 which can load the advertisement in example.com using the web browser.

Figure 9:
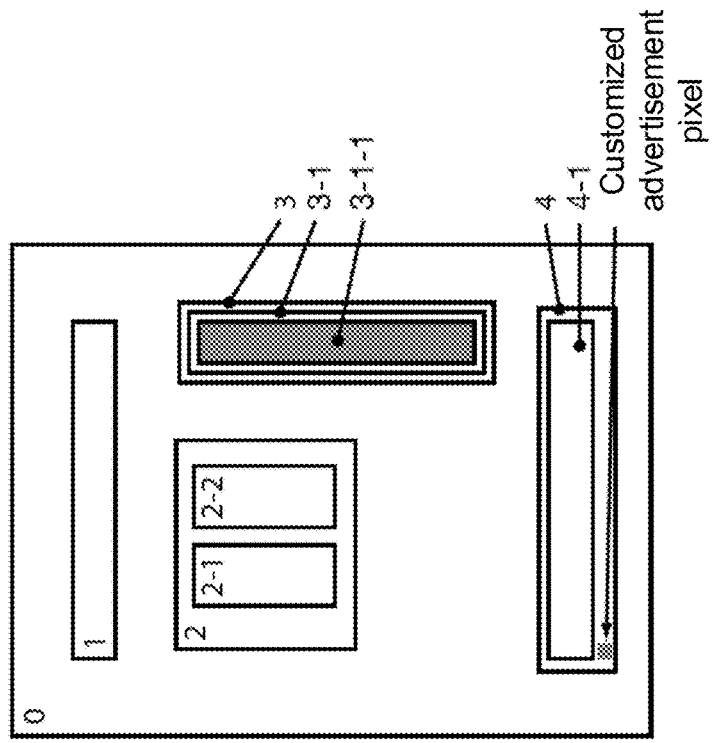
FIG. 9 shows an illustrative example of a layout of frames on a web page in accordance with some embodiments of the disclosed subject matter.

In some embodiments, the advertisement guidance application can use collected information relating to the previously transmitted and/or received advertisement identification messages to detect the frames associated with a web page on which an advertisement selected to be loaded or on which the selected advertisement is loaded without invoking the event listener and/or event handler. Based on this detection of advertisement identification messages, the application can generate a structural accounting of the frames on a web page. For example, as shown in FIG. 9, in addition to transmitting messages to the frames on a webpage, the application can generate a structural accounting of the frames and indicate which frame or frames contains an advertisement identification message (e.g., "I am an approved advertisement"). The generated accounting can include, for example, the base-level page (identified as 0 in FIG. 9), a non-nested advertisement (identified as 1 in FIG. 9), a widget (identified as 2 in FIG. 9) with two sub-frames (identified as 2-1 and 2-2 in FIG. 9), a three-level nested advertisement with an advertisement identification message (identified as 3, 3-1, and 3-1-1 in FIG. 9), and a two-level nested advertisement with monitoring code (identified as 4 and 4-1 in FIG. 9).

Figure 10:
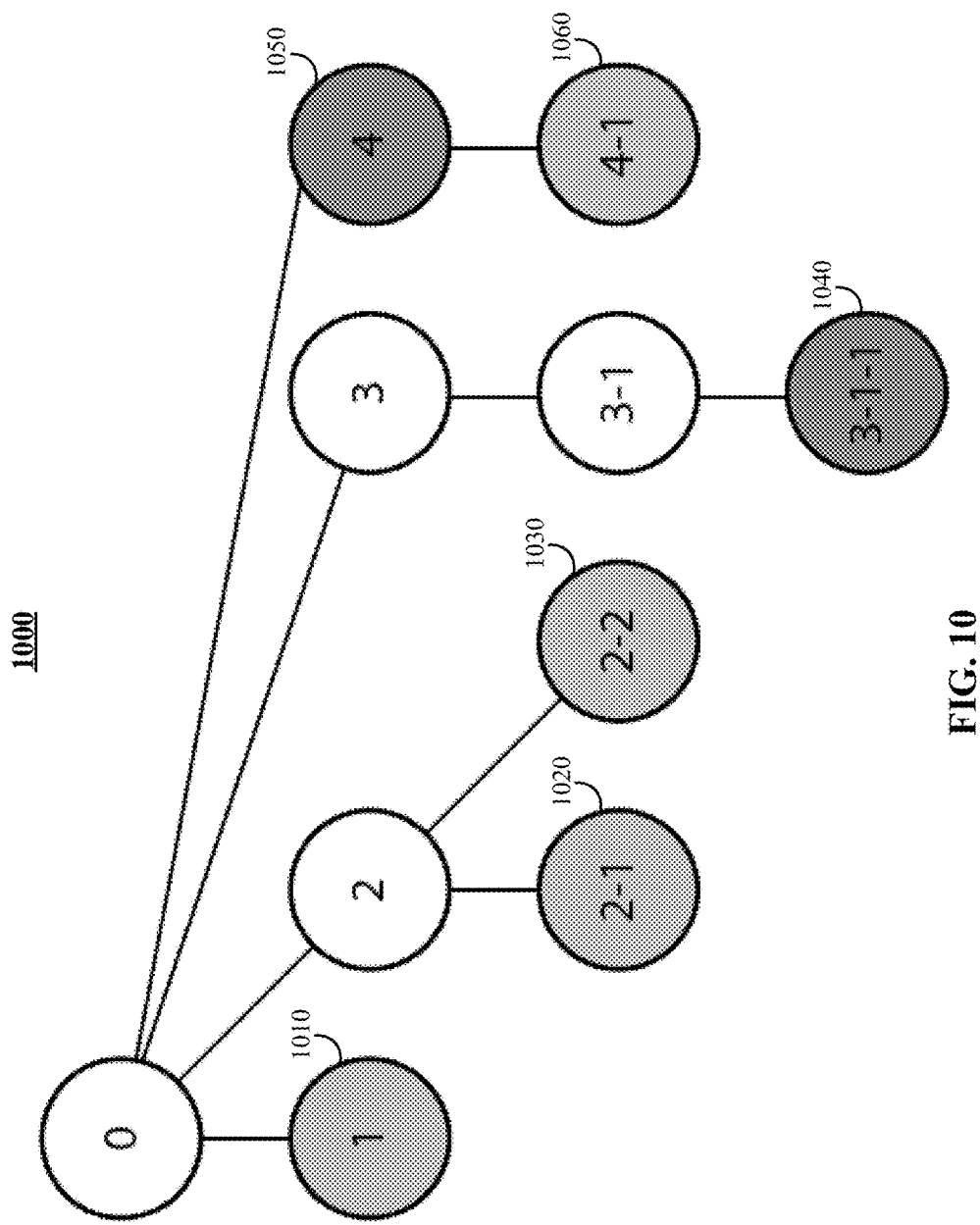
FIG. 10 shows an illustrative example of a structure of frames on the web page illustrated in FIG. 9 shown in a tree structure according to some embodiments of the disclosed subject matter.

In some embodiments, the application can represent the accounting of the frames on the web page in a tree structure. For example, as shown in FIG. 10, the application can display a tree that includes frames and nested frames. The generated accounting can indicate the lowest leaf on each branch of the tree—e.g., 1010, 1020, 1030, 1040, and 1060. The generated accounting can also indicate which leaves include an advertisement identification message (e.g., "I am an approved advertisement")—e.g., 1040 and 1050. In a more particular example, the application can generate the tree structure concurrently while recursively walking through the frames of the web page. That is, in response to transmitting messages to or receiving a message(s) from the frames of the web page, the frame accounting can be updated to include additional frames and/or nested frames.

In some embodiments, the application can transmit information relating to the accounting of the frames on the web page to an advertisement server or any other suitable computing device. For example, the application can transmit a period-separated list of leaves. For example, from the three-level nested advertisement with the advertisement identification message (identified as 3, 3-1, and 3-1-1 in FIG. 9), the application can transmit the following message:

1.2-1.2-2.3-1-1*.4-1

The period-separated list of leaves provides the lowest level for each branch of the tree and the asterisk ("*") indicates the frame within the list that contains the advertisement identification message. In another example, from the two-level nested advertisement with monitoring code (identified as 4 and 4-1 in FIG. 9), the application can transmit the following message:

1.2-1.2-2.3-1-1.4*.4-1

However, any suitable syntax for transmitting information relating to the account of the frames on the webpage can be used. For example, punctuation other than periods and/or decimals can be omitted, such that the body of the message can be:

1.21.22.311.4.41

Upon receiving a frame accounting, a period-separated list of leaves, or any other suitable representation of the frames associated with a page, the application can generate user engagement metrics for presenting to an advertiser. For example, based on the frame structural accounting, the application may determine the number of approved advertisements that appear on the web page. In another example, the application can calculate a value corresponding to page clutter based on the number of frames or number of nested frames on the webpage. More particularly, the application can determine the likelihood that an advertisement is viewed by a browser on a web page based on page clutter. In yet another example, the application may calculate the in-view probability or the likelihood of an advertisement being in view during a user session given the complexity or clutter of a webpage. Similarly, based on page clutter or any other suitable information derived from the frame accounting, the application can determine an in-view on load probability, which determines the likelihood of an advertisement being in view upon page load, or the in-view on unload probability, which determines the likelihood of an advertisement being in view when a page is unloaded.

In accordance with various embodiments of the disclosed subject matter, mechanisms for correlating information corresponding to multiple related frames on a web page are provided. In some embodiments, these mechanisms can include transmitting messages between frames (e.g., iframes) on the web page that cannot directly determine what content is loaded in the other frame (e.g., due to the web browser's implementation of the same origin policy) to facilitate identification of information common to corresponding frames on the web page. For example, in some embodiments, messages can be transmitted between iframes on the page, and based on information in the messages identifying the location of the transmitting iframe within the structure of the web page, corresponding iframes (e.g., iframes that are nested) can be identified and communicated to a server that generates metrics for content presented in one of the corresponding iframes. As used herein, corresponding frames can be frames that correspond to the same area or at least part of the same area of a web page. For example, as shown in FIG. 9, frames 2, 2-1 can be corresponding frames, frames 2 and 2-2 can be corresponding frames, frames 3, 3-1 and 3-1-1 can be corresponding frames, and frames 4 and 4-1 can be corresponding frames.

In some embodiments, the mechanisms described herein for correlating information corresponding to multiple related frames on a web page can transmit information to a server indicating identifying information of frames that correspond on the web page to the frame transmitting the information. For example, each iframe that loads content (such as a pixel tag, an advertisement, etc.) configured in accordance with the mechanisms described herein can transmit a message to a server identifying any other iframes (e.g., using an identification number assigned to the iframe and/or content loaded in the iframe) that correspond to the transmitting iframe on the web page, and the locations of those iframes within the structure of the web page.

In some embodiments, the mechanisms described herein for correlating information corresponding to multiple related frames on a web page can generate one or more metrics for the content in various corresponding frames as a group, rather than individually generating metrics for each corresponding frame. For example, based on information sent from one or more individual corresponding iframes and the information identifying which iframes on the web page are corresponding iframes, a server configured in accordance with the mechanisms described herein can use viewability information from multiple corresponding iframes to determine whether content (e.g., an advertisement) in one of those iframes was within the viewport of the web browser that loaded the web page and/or for how long the content was within the viewport. Such a metric for the corresponding iframes as a group can, in some cases, provide a common metric which multiple interested parties (e.g., a publisher of a web page, an advertiser, a supply side platform, a demand side platform, etc.) can agree to use, which can reduce administrative costs related to online advertising. In the absence of such a common metric, different parties associated with different iframes in a corresponding group of iframes may come to different conclusions as to whether the advertisement was viewable, whether there was an impression that should be paid for, etc., based on information provided from a single one of the corresponding iframes associated with each parties content.

Figure 11:
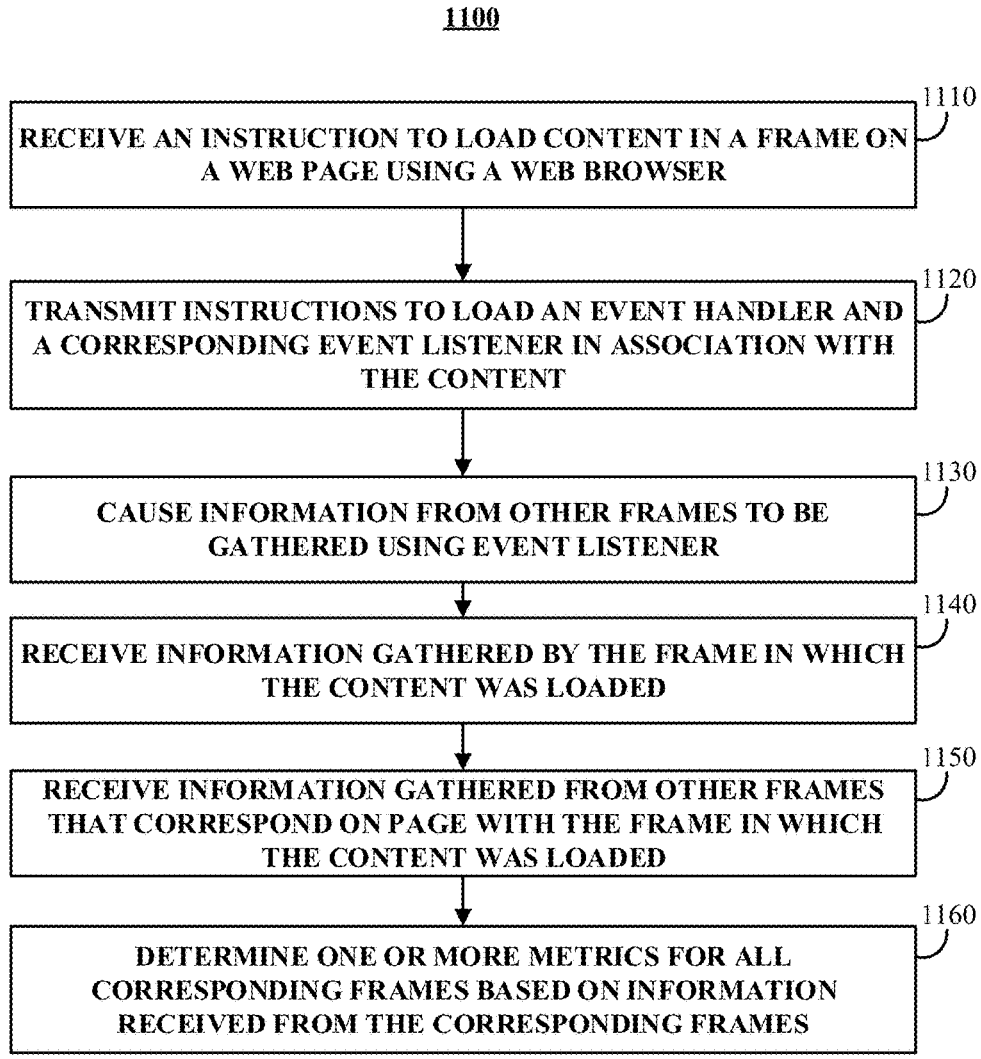
FIG. 11 shows an example of a process for collecting information corresponding to multiple related frames in accordance with some embodiments of the disclosed subject matter.

FIG. 11 shows an example 1100 of a process for collecting information corresponding to multiple related frames in accordance with some embodiments of the disclosed subject matter. As shown in FIG. 11, in some embodiments, process 1100 can start at 1110 by receiving a request for content to be loaded in a frame on a web page using a web browser. In some embodiments, such an instruction to load content can be received from any suitable source. For example, a user can instruct a web browser being executed by a user device (e.g., user device 510 described above in connection with FIG. 5) to load a particular web page (e.g., by entering a uniform resource locator (URL), by selecting a hyperlink, etc.), and the web browser can send a request for content associated with a particular frame to load content for that frame based on instructions associated with that frame. In some embodiments, sending a request to load content can involve transmitting a request to a content server that stores the requested content. In some embodiments, the content server can count the number of times the requested content is served to each web page. In a more particular example, where the content is an advertisement, the content server can be an advertisement server and the advertising server can count the number of times that the advertisement is served to a particular web page and/or the total number of times that the advertisement is served to all web pages.

In some embodiments, a frame (e.g., an iframe) in the web page can include instructions to load content from a particular location (e.g., as a URL and/or other suitable identifying information of a location from which to download and/or load content). Additionally in some embodiments, the frame (e.g., the iframe) can include one or more nested frames, which can themselves also contain nested frames, and so one. Each of these nested frames can include instructions for requesting content, where each request for content can be a request for different content. In some embodiments, such as in cases in which an iframe is nested within another iframe, each of the iframes can request content from a different content server and/or from a different domain. For example, the highest level iframe can include instructions to request content from a first location that includes monitoring code and instructions to load a nested iframe within the highest level iframe, and the nested iframe can include instructions to request content from a second location. In a more particular example, the nested iframe can itself load another nested iframe which includes instructions for requesting content from a content provider (e.g., an advertisement from an advertisement server).

More particularly, as shown in window 310 of FIG. 3A, in response to receiving a request to load a particular web page including various frames (e.g., shown as frames 302, 304 and 306), the web browser requests content according to instructions in each frame. The content requested by some of these frames, such as frames 302 and 304, can be content that incorporates the mechanisms described herein and/or content that is rated, qualified, and/or endorsed by any suitable entity. For example, as described herein, frames 302 and 304 can send messages to other frames loaded on the web page, including frames nested within frames 302 and 304, wait for a response, and send information to a server to provide information regarding what other content is loaded on the web page in the other frames. Additionally, some of these frames, such as frame 306, can correspond to content that is not configured in accordance with the mechanisms described herein and, accordingly, may not send messages to other frames loaded on the web page or receive such messages sent by other frames.

At 1120, process 1100 can transmit instructions to load an event handler and a corresponding event listener associated with the content to be loaded to a frame that sent the instruction at 1110 to load the content. In some embodiments, process 1100 can also transmit information about the content to be loaded in the frame and/or content to be loaded by a nested frame within the frame. In some embodiments, the information about the content can include any suitable information about the content. For example, the information about the content can include information specifying a producer of the content, a provider of the content, descriptive information about the content (e.g., a semantic category describing the content), etc. In a more particular example, the information about the content can include information about an advertisement to be presented within the frame (and/or within a nested frame), such as information about the advertiser associated with the advertisement, information about an advertising campaign with which the advertisement is associated, etc.

In response to the instructions to load the event handler and event listener, the web browser that loaded the web page can load an event handler and event listener for the frame that requested the content (e.g., frame 302). As described above in connection with window 320 of FIG. 3A, an event handler (not shown) and a corresponding event listener (represented by icon 308) can be loaded for frames 302 and 304. Event listener 308 can wait for messages sent by other frames on the web page. For example, event listener 308 associated with frame 302 can listen for messages transmitted from other frames on the web page, such as frame 304 and/or a frame nested within frame 302. In a more particular example, an event listener associated with a particular frame can listen for messages or cues from other frames on the page. The message or cue can include any suitable information such as identifying information of the content loaded in the frame (and/or a frame or frames nested within that frame) that sent the message or cue, identifying information of the frame that sent the message or cue, information identifying one or more properties of the content loaded in the frame (and/or a frame or frames nested within that frame) such as whether the content is an approved advertisement, information identifying a time when the message and/or cue was sent, other suitable information, or any suitable combination thereof. In some embodiments, a format of an incoming message and/or cue can be checked to determine whether it matches an expected format. Additionally, in some embodiments, messages and/or cues that do not match the expected format can be rejected and/or ignored.

In some embodiments, messages can be sent between frames using any suitable technique or combination of techniques. For example, in some embodiments, messages can be sent between iframes by sending messages through a higher level window that contains both iframes, such as a top-level window, such as techniques described above in connection with 210 of FIG. 2. In another example, messages can be sent from an event handler associated with a first browser window to advertisements (e.g., iframes) located in different windows and/or different portions of a web browser application in which the advertisements are loaded.

In some embodiments, messages can be sent once and/or multiple times from a single frame. For example, a message containing any suitable information can be sent to each other frame on a web page upon loading the event handler and/or event listener. As another example, a message containing any suitable information can be sent after a predetermined period of time has passed. As another example, a message containing any suitable information can be sent upon any suitable event happening, such as upon the web page being unloaded (e.g., upon the web browser navigating to a different page, upon the window in which the web page is loaded being closed, etc.), or in response to receiving a message from new content that has been loaded on the web page.

At 1130, process 1100 can cause information from other frames to be gathered using the event listener loaded in response to the instructions transmitted at 1120. In some embodiments, any suitable technique or combination of techniques can be used to cause the information received from other frames to be gathered. For example, process 1100 can send, at 1130, instructions that cause information received from other frames using the event listener loaded in response to the instructions transmitted at 1120 to be processed and/or stored (e.g., in a cache associated with the web browser). In a more particular example, process 1100 can cause the browser to execute code that processes and/or stores the information received by the event listener. Such code can be in any suitable programming and/or markup language and can be executed by the web browser, a plug-in, an extension, and/or any other suitable application.

In some embodiments, the gathering of the information by the code associated with the frame can include determining whether each message received from another frame is in a proper and/or expected format. For example, a message that is not formatted in accordance with the mechanisms described herein can be received from another frame, and such a message can be ignored and/or otherwise treated differently than a message that is received in an expected format.

In some embodiments, the gathering of the information by the code associated with the frame can include extracting information from messages received from other frames, processing that information, and/or organizing that information. For example, in some embodiments, identifying information associated with the message (e.g., identifying information of the content loaded in the frame from which the message is sent) can be extracted from the message. As another example, a time when the message was sent can be extracted from the message. As yet another example, a location of the frame from which the message was sent in a structure of the web page can be extracted from the message. As still another example, a latency can be calculated to determine the amount of time that passed between when the message was sent and when the message was received. In such an example, the latency can be calculated based on the sent time of the message.

In some embodiments, the information extracted from the message and/or information processed based on the information in the message by the code associated with the frame can be organized into a message to be transmitted to a server. In some embodiments, the code associated with the frame can include in the message to be transmitted to the server information about only certain frames and/or only certain information. For example, in some embodiments, the code associated with the frame can include only information about one or more frames in which the frame is nested (sometimes referred to herein as parent frames) and/or one or more frames nested within the frame (sometimes referred to herein as child frames). As another example, in some embodiments, the code associated with the frame can include only information about one or more frames that include advertisements. As yet another example, in some embodiments, the code associated with the frame can include only information about content associated with a particular entity (e.g., an entity that is also associated with the content in the frame, a particular competitor, etc.). As still another example, the code associated with the frame can send multiple messages including different information, and/or can send a message including some information and excluding any other suitable information.

In some embodiments, the code associated with the frame can format the information included in the message in a particular way. For example, in a case where the code associated with the frame is to send a message including information about parent and child frames, the code associated with the frame can include information identifying the position of each frame within the page (e.g., as described above in connection with FIG. 10) and information identifying the sending frame (e.g., identifying information assigned to content in the other frames). In such an example, the information in the message can be used (e.g., by the server) to determine that the frames in which the content loaded correspond to each other in the structure of the web page, and information received in connection with that content can be related to information received in connection with each other frame.

At 1140, process 1100 can receive information gathered by the code associated with the frame that requested the content at 1110. In some embodiments, the information can be received using any suitable technique or combination of techniques, and can be received in any suitable format. Process 1100 can receive any suitable information at 1140, such as the information gathered by the code associated with the content based on the instructions transmitted at 1130. Additionally or alternatively, in some embodiments, additional information can also be received from the frame that requested the content, such as viewability information that indicates a likelihood that the frame was viewable in the web page (e.g., a likelihood that the frame was within the viewport of the web browser window in which the web page including the frame is loaded). Content viewability features are further described, for example, in commonly owned, commonly assigned U.S. patent application Ser. No. 13/836, 700, which is incorporated by reference herein in its entirety.

At 1150, process 1100 can receive information gathered by code associated with other frames on the web page that correspond on the web page with the frame which requested the content at 1110. In some embodiments, process 1100 can receive the information gathered by the other frames at any suitable time, using any suitable technique or combination of techniques, and/or in any suitable format. As described above in connection with 1140, process 1100 can receive information that was gathered by code associated with other frames based on instructions, such as the instructions sent at 1130. Additionally, process 1100 can receive any other suitable information from the other frames, such as content viewability information.

At 1160, process 1100 can determine one or more metrics for corresponding frames on the web page based on information received from the corresponding frames. In some embodiments, process 1100 can determine that frames are corresponding frames using any suitable technique or combination of techniques. For example, based on the information received at 1140 and/or 1150 such as identifying information of the frame sending the information, identifying information of frames from which the information was gathered and/or information identifying a location of each frame within the web page, process 1100 can determine which frames correspond within the web page (e.g., which frames are nested within a parent frame and/or which frames are parent frames of a nested frame). Additionally, in some embodiments, after determining that the frames are corresponding, process 1100 can combine information about each of the corresponding frames using any suitable technique or combination of techniques to generate information that is relevant to the corresponding frames as a group, which can then be used to generate one or more metrics about the corresponding frames as a group, rather than generating metrics about each corresponding frame individually.

In some embodiments, process 1100 can select which information received at 1140 and/or 1150 is to be used to determine the one or more metrics at 1160 using any suitable technique or combination of techniques. For example, each frame can send information when specified events happen at the web page, such as when the web page is loaded, when the event handler and/or event listener are first loaded in the frame (e.g., when this does not coincide with the web page being loaded), at specified time intervals after the web page, the event handler and/or the event listener are loaded (e.g., one second after loading, five seconds after loading, etc.), when the web page, the event handler and/or the event listener are unloaded (e.g., when the web browser navigates away from the web page, when the content loaded in the frame is replaced by other content, etc.), and/or any other suitable events. In such an example, when information received at 1140 and 1150 corresponds to the same event, process 1100 can select whether to use the information from one of the frames to calculate the metric and/or whether to ignore, delete or otherwise not use the information from the other frames. In a more particular example, in cases in which one of the frames has the same domain as the web page and/or can otherwise normally communicate with the other content on the web page (e.g., the frame is not prevented from communicating by the web browser's same origin policy) and is the only frame that can communicate with the content on the web page, process 1100 can select information received from that frame for each event for which that frame provided information. Note that frames that are not prevented from communicating with content on the web page, such as content having the same domain as the web page or content loaded in the top level frame of the web page, are sometimes referred to herein as friendly frames. In another more particular example, in cases in which information is received from more than one friendly frame at 1140 and 1150 for a particular event, process 1100 can select the information for the event that has a latest time stamp. In yet another more particular example, in cases in which no information is received from a friendly frame for a particular event and information is received from more than one non-friendly frame at 1140 and 1150 for the particular event, process 1100 can select the information for the event that has a latest time stamp. In still another more particular example, in cases in which the content loaded in one of the corresponding frames is a video, when information is received from more than of the corresponding frames at 1140 and 1150 for a particular event, process 1100 can select the information for the event received from the frame that includes the video.

In some embodiments, process 1100 can determine any suitable metric for the corresponding frames using information gathered from the various corresponding frames. For example, process 1100 can determine viewability information of the content of one or more of the corresponding frames based on information received from several corresponding frames. In a more particular example, process 1100 can receive viewability information gathered from frames as described above in connection with 1140. As another example, process 1100 can determine whether the content in one of the corresponding frames was selected based on the information from one or more of the frames. As yet another example, process 1100 can determine whether a conversion has occurred based on an advertisement presented within one or more of the corresponding frames.

In some embodiments, any one of the metrics and/or any combination of metrics can be updated as more information is received from the corresponding frames. Additionally, in some embodiments, process 1100 (and/or any other suitable process) can receive information from various advertisements that are part of an online advertising campaign that can include large numbers of advertisements (e.g., on the order of thousands, tens of thousands, millions, etc.) that are served per day, and can gather and update information about the advertising campaign periodically (e.g., every hour, every day, every week, etc.).

In some embodiments, the information received at 1140 and 1150 can correspond to information that can be used by one side of an advertising transaction to determine the value of the impression. For example, the information received from one frame at 1140 can correspond to information that is available to the advertiser (and/or an agent of the advertiser), which is then used by the advertiser to determine whether the advertisement was presented, where on the web page the advertisement was when it was loaded, how long the advertisement was presented by the web page, potentially whether the advertisement was viewable and/or likely to have been viewable (e.g., as described above in connection with viewability information), etc. The advertiser can use this information to determine whether the advertiser should pay for that advertisement and/or how much the advertiser should pay for that advertisement (e.g., based on terms agreed to prior to placing the advertisement). In such an example, the information received from another frame at 1150 can correspond to information that is available to the publisher (and/or an agent of the publisher) of the web page on which the advertisement was presented, which is then used by the publisher to determine whether the advertisement was presented, where on the web page the advertisement was when it was loaded, how long the advertisement was presented by the web page, potentially whether the advertisement was viewable and/or likely to have been viewable (e.g., as described above in connection with viewability information), etc. The publisher can use this information to determine whether the advertiser should pay for that advertisement and/or how much the advertiser should pay for that advertisement (e.g., based on terms agreed to prior to placing the advertisement). However, there may be differences between the information received at 1140 and the information received at 1150 due to, for example, whether the frame is a friendly frame, assumptions built into the code that is reporting the information, when the information was generated, where the pixel tag was placed within the frame, etc. In such an example, the advertiser and the publisher may come to different conclusions as to whether and/or how much the advertiser should pay for a particular advertisement. In some embodiments, the advertiser and/or publisher can request the metric generated at 1160 based on the information received at 1140 and/or 1150, which can then be used to settle the dispute as to whether the advertiser should pay and/or how much the advertiser should pay for a particular advertisement.

Figure 12:
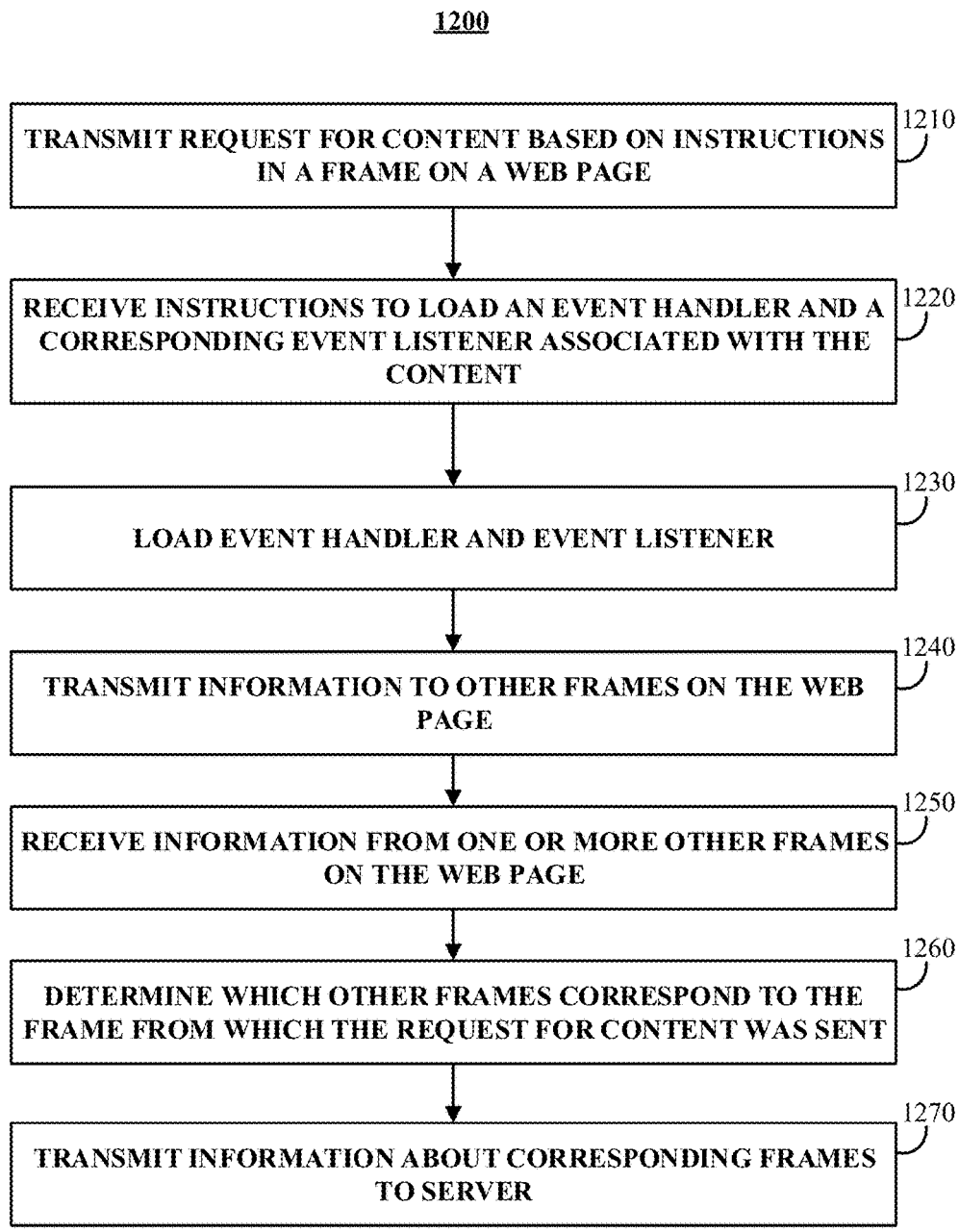
FIG. 12 shows an example of a process for gathering information corresponding to multiple related frames on a web page in accordance with some embodiments of the disclosed subject matter.

FIG. 12 shows an example 1200 of a process for gathering information corresponding to multiple related frames on a web page in accordance with some embodiments of the disclosed subject matter. As shown in FIG. 12, process 1200 can start at 1210 by sending a request for content based on instructions in a frame on a web page. For example, the frame (e.g., an iframe) can include a URL and/or any other suitable information that can be used to request content (e.g., from a remote server). As another example, the frame can include code, such as JavaScript, that can cause the web browser to perform any suitable actions that can result in content being requested. In some embodiments, process 1200 can be associated with a single frame of the web page, and multiple instances of process 1200 can be performed corresponding to different frames that are configured in accordance with the mechanisms described herein.

In some embodiments, process 1200 can send the request for content to any suitable destination. For example, in some embodiments, the request for content can be sent to an advertisement server. As another example, in some embodiments, the request for content can be sent to a server that provides monitoring code, a pixel tag, etc., and may redirect to an advertising server and/or any other suitable content server.

In some embodiments, the web browser can load content (e.g., image data, video data, text data, etc.) that is returned in response to the request sent at 1210. In some embodiments, for example, the web browser can load an advertisement in the frame (or in a nested frame or parent frame) from which the content was requested.

At 1220, process 1200 can receive instructions to load an event handler and a corresponding event listener in association with the content that was requested at 1210. In some embodiments, the instructions can be received from any suitable source and/or in response to any suitable request. For example, the instructions to load the event handler and/or the event listener can be received from the same source as the content received at 1210. In another example, the instructions to load the event handler and/or the event listener can be received from a source specified by instructions loaded by the web page that are present when the web page is loaded (e.g., instructions placed in the web page by the publisher prior to the web page being served to the device executing process 1200). In yet another example, the instructions to load the event handler and/or the event listener can be received from a source specified by instructions returned in response to a request for content (e.g., the instructions can be returned in association with the content requested at 1210).

At 1230, process 1200 can load the event handler and/or event listener. In some embodiments, the event handler and/or event listener can be loaded using any suitable technique or combination of techniques. For example, the event handler and/or event listener can be loaded as described above in connection with 130 of FIG. 1 and in connection with FIG. 3.

At 1240, process 1200 can transmit information to other frames on the web page, including frames in which the frame associated with process 1200 is nested, and frames nested within the frame associated with process 1200. In some embodiments, process 1200 can transmit the information to other frames on the web page using any suitable technique or combination of techniques. For example, process 1200 can transmit the information as described above in connection with 130 of FIG. 1.

In some embodiments, the information transmitted at 1240 can include any suitable information. For example, the information can include identifying information (e.g., an identification number or other alphanumeric code included in metadata for the content) of the content that is loaded in the frame associated with process 1200. As another example, in some embodiments, the information can include information indicating where in a structure of frames on the web page the frame is located (e.g., as described above in connection with FIG. 10). As yet another example, in some embodiments, the information can include information about the content, such as information described above in connection with 140 of FIG. 1.

At 1250, process 1200 can receive information sent by one or more other frames on the web page. In some embodiments, process 1200 can receive the information from the one or more other frames using any suitable technique or combination of techniques, such as by using the event listener loaded at 1230. In some embodiments, the information received by process 1200 at 1250 can include any suitable information, such as information sent by another frame associated with another instance of process 1200 at 1240. For example, as described above in connection with 1240, another instance of process 1200 can send identifying information of the frame and/or the content loaded in the frame, the location of the frame within the structure of the page, etc.

At 1260, process 1200 can determine which other frames from which information was received correspond to the frame associated with process 1200. In some embodiments, process 1200 can determine which other frames correspond to the frame associated with process 1200 using any suitable technique or combination of techniques. For example, in some embodiments, process 1200 can compare the location of the frame associated with process 1200 within the structure of the web page to the location of other frames within the structure of the web page. In a more particular example, process 1200 can determine from the location indicated by other frames, whether those other frames are a child frame or a parent frame of the frame associated with process 1200.

At 1270, process 1200 can send information about the corresponding frames to a server. In some embodiments, process 1200 can use any suitable technique or combination of techniques to send the information about the corresponding frames to the server. For example, in some embodiments, process 1200 can send the information to the server over the Internet as a message that includes identifying information of the frame and/or content loaded in the frame as well as the information about the corresponding frames. In a more particular example, the message sent by process 1200 can include identifying information of the frame and/or content loaded in the frame in the metadata (e.g., in the header) of the message.

In some embodiments, process 1200 can send the information to the server at any suitable time or times. For example, in some embodiments, process 1200 can send the information after a predetermined amount of time has passed since the content and/or event listener associated with process 1200 was loaded. As another example, process 1200 can send the information after a predetermined amount of time has passed since process 1200 last sent information about the corresponding frames to the server. As yet another example, process 1200 can send the information after a predetermined event occurs, such as after an instruction to close the browser window in which the web page is loaded is received, after an instruction to navigate to a new web page is received, etc.

In some embodiments, process 1200 can send the information to multiple servers in parallel, and/or can send the information to different servers at different times. For example, in some embodiments, process 1200 can send the information to a first server that executes process 1100. As another example, in some embodiments, process 1200 can send the information to a server associated with an advertiser that placed an advertisement in the frame and/or a server associated with a publisher that publishes the web page in which the frame is loaded.

In some embodiments, process 1200 can send the message using any suitable format. For example, in some embodiments, the body of the message can be formatted by pairing the location of the sending frame with the identifying information of the sending frame, for each frame that sent a message that was received at 1250 which corresponds to the frame associated with process 1200. As another example, in some embodiments, the body of the message can include the location of the frame associated with the process 1200 and one or more characters identifying that location as being for the frame that is transmitting the message. As yet another example, in some embodiments, a latency indicating an amount of time that it took for a message received from a corresponding frame can be included with the other information about that frame. As still another example, in some embodiments, the message can be organized based on the organization of the corresponding frames on the web page. In a more particular example, in a case where there are three corresponding frames with a first frame having identifying information ABCD and a location of 14, a second fame having identifying information EFGH and a location of 1411, and a third frame having identifying information JKLM and a location of 14111, the message from the frame having identifying information EFGH can be:

14.ABCD.2|1411*|14111.JKLM.1907.

In such a more particular example, the location of the sending frame is denoted by "*" and the information about each frame is separated from the information about another frame by "|". In this example, the location of each frame is followed by a "." which is followed by the identifying information associated with that frame, then another "." and the latency of the message received from that frame. Note that this is merely given as an example, and the identifying information would likely be a much longer string in practice.

In some embodiments, process 1200 can execute repeatedly and continue to gather information from other frames on the web page that load content after information is first sent to the server (or servers). For example, the event listener loaded at 1230 can continue to receive any messages directed to the frame associated with the event listener, and when new information is received and/or after a predetermined period of time has passed, process 1200 can send updated and/or new information to the server.

Figure 13:
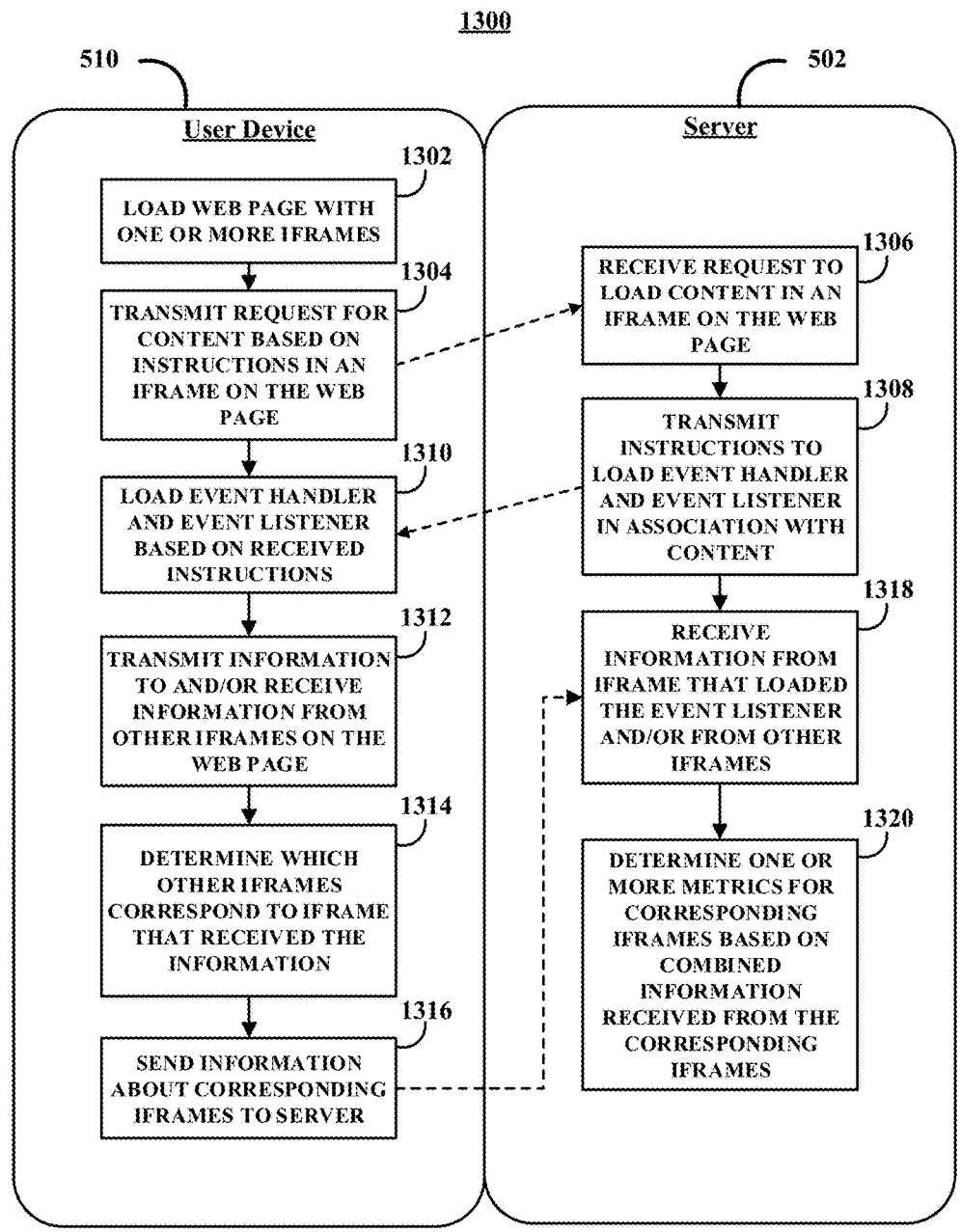
FIG. 13 shows a diagram illustrating an example of a data flow that can be used in processes of FIGS. 11 and 12 in accordance with some embodiments of the disclosed subject matter.

FIG. 13 shows an example 1300 of a diagram illustrating an example of a data flow that can be used in processes of FIGS. 11 and 12 in accordance with some embodiments of the disclosed subject matter. As shown in FIG. 13, at 1302, user device 510 can load a web page that includes one or more iframes. As described above in connection with 1210 of FIG. 12, the web page can be loaded by a web browser being executed by user device 510 and/or any other suitable application being executed by user device 510.

At 1304, user device 510 can transmit a request for content based on instructions in an iframe included on the web page. As described above in connection with 1210, the request for content can be transmitted using any suitable technique or combination of techniques and can be transmitted to any suitable server.

At 1306, server 502 can receive the request to load content in the iframe on the web page. As described above in connection with 1110, the request can be received at any suitable server and/or can be received using any suitable technique or combination of techniques.

At 1308, server 502 can transmit instructions to client device 510 to load an event handler and a corresponding event listener in association with the content requested for the iframe at 1306. In some embodiments, the instructions to load the event handler and the event listener can be sent using any suitable technique or combination of techniques.

At 1310, user device 510 can load the event handler and the event listener based on the instructions sent by server 502 at 1308. In some embodiments, user device 510 can use any suitable technique or combination of techniques to load the event handler and the event listener at 1310, such as techniques described above in connection with 130 of FIG. 1 and 1230 of FIG. 12.

At 1312, user device 510 can transmit information from the iframe associated with the event listener loaded at 1310 to one or more other iframes on the web page. In some embodiments, user device 510 can cause any suitable information to be transmitted to the other frames, such as identifying information of the content associated with the iframe, identifying information of the iframe, information about the location of the iframe transmitting the information within the web page (e.g., as described above in connection with FIG. 10), information about the content loaded in the iframe transmitting the information (e.g., as described above in connection with 230 of FIG. 2), any other suitable information, or any suitable combination thereof.

Additionally or alternatively, at 1312, user device 510 can receive information transmitted from other iframes loaded on the web page using the event listener loaded at 1310. In some embodiments, user device 510 can receive any suitable information from the other iframes loaded on the page, such as identifying information of the content associated with the iframe transmitting the information, identifying information of the iframe transmitting the information, information about the location of the iframe transmitting the information within the web page (e.g., as described above in connection with FIG. 10), information about the content loaded in the iframe transmitting the information (e.g., as described above in connection with 230 of FIG. 2), any other suitable information, or any suitable combination thereof.

At 1314, user device 510 can determine which other iframes correspond, within the structure of the web page, to the iframe that loaded the event listener at 1310 and received the information from the other iframes at 1312. In some embodiments, user device 510 can use any suitable technique or combination of techniques to determine which other iframes correspond to the iframe that loaded the event listener at 1310, such as techniques described above in connection with 1260.

At 1316, user device 510 can transmit the information about corresponding frames to the server. In some embodiments, user device 510 can transmit the information using any suitable technique or combination of techniques, at any suitable time or times, and in any suitable format. Note that, in some embodiments, user device 510 can transmit multiple requests for content at 1304 for different iframes within the web page, including, in some cases, nested iframes. In such embodiments, user device can execute 1310-1316 serially and/or in parallel for each iframe for which an event handler and/or event listener was loaded.

At 1318, server 502 can receive information from the iframe that was transmitted by user device 510 at 1316. In some embodiments, server 502 can receive the information transmitted by user device 510 using any suitable technique or combination of techniques, and can receive any suitable information gathered by the event listener loaded by user device 510 at 1310, such as information described above in connection with 1240 and/or 1250 of FIG. 12. Note that, in some embodiments, in cases where user device 510 loads event listeners for multiple iframes within the web page and executes 1310-1316 for each of those iframes, server 502 can receive information from many different iframes within the web page.

At 1320, server 502 can determine one or more metrics for corresponding iframes based on combined information received from various corresponding iframes on the web page. In some embodiments, server 502 can determine any suitable metric or metrics based on the information received from the corresponding frames, such as the metrics described above in connection with 1160 of FIG. 11.

In some embodiments, the mechanisms described herein can include server-side software, server-side hardware, client-side software, client-side hardware, or any suitable combination thereof. For example, the mechanisms described herein can encompass a computer program written in a programming language recognizable by hardware processor 612, hardware processor 622 (e.g., a program written in a programming language, such as, Java, C, Objective-C, C++, C#, Javascript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1, 2, 4, 7, 8 and 11-13 can be executed or performed in any order or sequence not limited to the order and sequence shown and described in the figures. Also, some of the above steps of the processes of FIGS. 1, 2, 4, 7, 8 and 11-13 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for correlating information corresponding to multiple related frames on a web page are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed:

1. A method for identifying corresponding iframes on a web page to a server, the method comprising:
   loading a web page including a plurality of iframes;
   requesting first content for a first iframe of the plurality of iframes;
   receiving the requested content for the first iframe over the Internet and first identifying information;
   receiving instructions over the Internet to load an event listener in association with the first iframe;
   loading the event listener in association with the first iframe;
   determining a location of the first iframe in a structure of the web page;
   transmitting a first message to at least a second iframe of the plurality of iframes that includes at least the first identifying information and information identifying the location of the first iframe in the structure of the web page;
   receiving, using the event listener, a second message from the second iframe that includes at least second identifying information associated with the second iframe and information identifying a location of the second iframe in the structure of the web page;
   determining that the second iframe is nested within the first iframe based on the information identifying the location of the second iframe; and
   transmitting a third message to a server including a structural accounting of iframes associated with the web page, wherein the structural accounting is represented in a tree structure that includes at least the first identifying information, the second identifying information, the information identifying the location of the first iframe in the structure of the web page, and the information identifying the location of the second iframe in the structure of the web page.

2. The method of claim 1, wherein transmitting the first message to the second iframe comprises using the function window.postMessage to send the first message to the second iframe through the top level window of the web browser.

3. The method of claim 1, further comprising:
   receiving, using the event listener, a fourth message from a third iframe that includes at least third identifying information associated with the third iframe and information identifying a location of the third iframe in the structure of the web page;
   determining that the first iframe is nested within the third iframe based on the information identifying the location of the third iframe; and
   wherein the third message also includes the third identifying information and information identifying the location of the third iframe in the structure of the web page.

4. The method of claim 3, wherein the second message and the fourth message each include timing information indicating when the respective message was sent.

5. The method of claim 4, further comprising, determining a latency for the second message and the fourth message, respectively, based on a time when the message was received and the time when the message was sent, wherein the third message further includes the latency determined for each of the second message and the fourth message.

6. The method of claim 3, further comprising formatting the third message such that information for the first frame comes after information for the third frame and information for the second frame comes after information for the first frame.

7. A system for identifying corresponding iframes on a web page to a server, the system comprising:
   a hardware processor that is programmed to:
      load a web page including a plurality of iframes;
      request first content for a first iframe of the plurality of iframes;
      receive the requested content for the first iframe over the Internet and first identifying information;
      receive instructions over the Internet to load an event listener in association with the first iframe;
      load the event listener in association with the first iframe;
      determine a location of the first iframe in a structure of the web page;
      transmit a first message to at least a second iframe of the plurality of iframes that includes at least the first identifying information and information identifying the location of the first iframe in the structure of the web page;
      receive, using the event listener, a second message from the second iframe that includes at least second identifying information associated with the second iframe and information identifying a location of the second iframe in the structure of the web page;
      determine that the second iframe is nested within the first iframe based on the information identifying the location of the second iframe; and
      transmit a third message to a server including a structural accounting of iframes associated with the web page, wherein the structural accounting is represented in a tree structure that includes at least the first identifying information, the second identifying information, the information identifying the location of the first iframe in the structure of the web page, and the information identifying the location of the second iframe in the structure of the web page.

8. The system of claim 7, wherein transmitting the first message to the second iframe comprises using the function window.postMessage to send the first message to the second iframe through the top level window of the web browser.

9. The system of claim 7, wherein the hardware processor is further programmed to:
   receive, using the event listener, a fourth message from a third iframe that includes at least third identifying information associated with the third iframe and information identifying a location of the third iframe in the structure of the web page;

determine that the first iframe is nested within the third iframe based on the information identifying the location of the third iframe; and wherein the third message also includes the third identifying information and information identifying the location of the third iframe in the structure of the web page.

10. The system of claim 9, wherein the second message and the fourth message each include timing information indicating when the respective message was sent.

11. The system of claim 10, wherein the hardware processor is further programmed to determine a latency for the second message and the fourth message, respectively, based on a time when the message was received and the time when the message was sent, wherein the third message further includes the latency determined for each of the second message and the fourth message.

12. The system of claim 9, wherein the hardware processor is further programmed to format the third message such that information for the first frame comes after information for the third frame and information for the second frame comes after information for the first frame.

13. A non-transitory computer-readable medium containing computer executable instructions that, when executed by a processor, cause the processor to perform a method for identifying corresponding iframes on a web page to a server, the method comprising:

loading a web page including a plurality of iframes;

requesting first content for a first iframe of the plurality of iframes;

receiving the requested content for the first iframe over the Internet and first identifying information;

receiving instructions over the Internet to load an event listener in association with the first iframe;

loading the event listener in association with the first iframe;

determining a location of the first iframe in a structure of the web page;

transmitting a first message to at least a second iframe of the plurality of iframes that includes at least the first identifying information and information identifying the location of the first iframe in the structure of the web page;

receiving, using the event listener, a second message from the second iframe that includes at least second identifying information associated with the second iframe and information identifying a location of the second iframe in the structure of the web page;

determining that the second iframe is nested within the first iframe based on the information identifying the location of the second iframe; and transmitting a third message to a server including a structural accounting of iframes associated with the web page, wherein the structural accounting is represented in a tree structure that includes at least the first identifying information, the second identifying information, the information identifying the location of the first iframe in the structure of the web page, and the information identifying the location of the second iframe in the structure of the web page.

14. The non-transitory computer-readable medium of claim 13, wherein transmitting the first message to the second iframe comprises using the function window.postMessage to send the first message to the second iframe through the top level window of the web browser.

15. The non-transitory computer-readable medium of claim 13, wherein the method further comprises:

receiving, using the event listener, a fourth message from a third iframe that includes at least third identifying information associated with the third iframe and information identifying a location of the third iframe in the structure of the web page;

determining that the first iframe is nested within the third iframe based on the information identifying the location of the third iframe; and wherein the third message also includes the third identifying information and information identifying the location of the third iframe in the structure of the web page.

16. The non-transitory computer-readable medium of claim 15, wherein the second message and the fourth message each include timing information indicating when the respective message was sent.

17. The non-transitory computer-readable medium of claim 16, wherein the method further comprises, determining a latency for the second message and the fourth message, respectively, based on a time when the message was received and the time when the message was sent, wherein the third message further includes the latency determined for each of the second message and the fourth message.

18. The non-transitory computer-readable medium of claim 15, wherein the method further comprises formatting the third message such that information for the first frame comes after information for the third frame and information for the second frame comes after information for the first frame.

* * * * *